United States Patent
Agrawal et al.

(10) Patent No.: US 9,426,770 B2
(45) Date of Patent: Aug. 23, 2016

(54) ACCESS POINT SELECTION FOR NETWORK-BASED POSITIONING

(71) Applicant: QUALCOMM Incorporated, San Diego, CA (US)

(72) Inventors: Meghna Agrawal, Sunnyvale, CA (US); Praveen Dua, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 14/183,286

(22) Filed: Feb. 18, 2014

(65) Prior Publication Data

US 2015/0094085 A1   Apr. 2, 2015

Related U.S. Application Data

(60) Provisional application No. 61/884,846, filed on Sep. 30, 2013.

(51) Int. Cl.
| | | |
|---|---|---|
| H04W 64/00 | (2009.01) | |
| A01K 1/01 | (2006.01) | |
| A47L 13/52 | (2006.01) | |
| E01H 1/00 | (2006.01) | |
| E01H 5/06 | (2006.01) | |

(52) U.S. Cl.
CPC ............... *H04W 64/00* (2013.01); *A01K 1/01* (2013.01); *A01K 1/0114* (2013.01); *A47L 13/52* (2013.01); *E01H 1/006* (2013.01); *E01H 5/06* (2013.01)

(58) Field of Classification Search
CPC ..... H04W 64/00; A01K 1/0114; A47L 13/52; E01H 1/006; E01H 5/06
USPC ................................................ 455/456.1–457
See application file for complete search history.

(56) References Cited

U.S. PATENT DOCUMENTS

| | | | |
|---|---|---|---|
| 8,478,298 B1 | 7/2013 | Mansour | |
| 2004/0258012 A1* | 12/2004 | Ishii | ................ H04L 47/10 370/328 |
| 2008/0130604 A1 | 6/2008 | Boyd | |
| 2008/0227463 A1* | 9/2008 | Hizume | ................ H04W 64/00 455/456.1 |

(Continued)

FOREIGN PATENT DOCUMENTS

| | | |
|---|---|---|
| EP | 2600165 A1 | 6/2013 |
| WO | 2010059934 A2 | 5/2010 |

(Continued)

OTHER PUBLICATIONS

International Search Report and Written Opinion—PCT/US2014/056205—ISA/EPO—Mar. 30, 2015—12 pgs.

(Continued)

*Primary Examiner* — Michael Mapa
(74) *Attorney, Agent, or Firm* — Hunter Clark PLLC

(57) ABSTRACT

A method for network-based positioning of a mobile device as described herein includes selecting a first set of access points (APs) to take first positioning measurements from the mobile device; obtaining the first positioning measurements from the first set of APs; selecting, based on the first positioning measurements, a second set of APs to take second positioning measurements from the mobile device; obtaining the second positioning measurements from the second set of APs; and determining a location of the mobile device based on the first positioning measurements and the second positioning measurements.

30 Claims, 12 Drawing Sheets

(56) References Cited

U.S. PATENT DOCUMENTS

| | | |
|---|---|---|
| 2009/0286549 A1* | 11/2009 | Canon ................ G01S 3/74 455/456.1 |
| 2010/0128637 A1 | 5/2010 | Aggarwal et al. |
| 2010/0130230 A1 | 5/2010 | Aggarwal et al. |
| 2010/0135178 A1 | 6/2010 | Aggarwal et al. |
| 2010/0246419 A1 | 9/2010 | Batta et al. |
| 2011/0045840 A1* | 2/2011 | Alizadeh-Shabdiz .... G01S 5/02 455/456.1 |
| 2011/0130116 A1* | 6/2011 | Yin .................. H04L 63/0876 455/411 |
| 2011/0183626 A1 | 7/2011 | Das et al. |
| 2012/0040696 A1 | 2/2012 | Siomina et al. |
| 2012/0295654 A1 | 11/2012 | Sridhara et al. |
| 2013/0170374 A1* | 7/2013 | Aljadeff ............... G01S 5/14 370/252 |
| 2014/0357294 A1* | 12/2014 | Rajakarunanayake .... G01S 5/00 455/456.1 |

FOREIGN PATENT DOCUMENTS

| | | | |
|---|---|---|---|
| WO | 2011019917 A1 | 2/2011 | |
| WO | WO 2011019917 A1 * | 2/2011 | ............ G01S 5/0236 |

OTHER PUBLICATIONS

International Preliminary Report on Patentability—PCT/US2014/056205, European Patent Office—The Hague, Netherlands, Nov. 27, 2015, 9 pgs.

Second Written Opinion from International Application No. PCT/US2014/056205, dated Sep. 2, 2015, 8 pages.

* cited by examiner

ACCESS POINT SELECTION FOR NETWORK-BASED POSITIONING

CROSS-REFERENCES TO RELATED APPLICATIONS

This application claims benefit of priority from U.S. Provisional Patent Application No. 61/884,846, filed Sep. 30, 2013, entitled "POSITIONING MEASUREMENT SCHEME WITH REDUCED MEASUREMENT LOAD," which is assigned to the assignee hereof, and which is incorporated in its entirety herein by reference.

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

Various technologies are utilized for locating the position of a wireless communication device. Some mobile positioning technologies are based on network-based positioning (NBP), in which a network communicating with a mobile device obtains indications of signal measurements made by a mobile device and computes the position of the device within the network. This is in contrast to mobile-based positioning (MBP), in which a mobile device measures signals from a network and estimates its own position. Applications of NBP and MBP include personal navigation, social networking, and targeting of content (e.g., advertisements, search results, etc.), among others.

Conventionally, a high number of APs are used in an NBP system for positioning a given mobile device. However, as the amount of network load associated with positioning increases proportionally to the number of APs used for positioning, use of a high number of APs results in a relatively high amount of positioning load in the network. Further, conventional NBP systems select APs for obtaining an initial position estimate for a mobile device arbitrarily and/or according to schemes that do not account for the positions of the APs relative to the area. This may result in a loss of positioning accuracy in the event that selected APs are too close or too far away from each other.

SUMMARY

An example of a method for network-based positioning of a mobile device as described herein includes selecting a first set of access points (APs) to take first positioning measurements from the mobile device; obtaining the first positioning measurements from the first set of APs; selecting, based on the first positioning measurements, a second set of APs to take second positioning measurements from the mobile device; obtaining the second positioning measurements from the second set of APs; and determining a location of the mobile device based on the first positioning measurements and the second positioning measurements.

An example of a positioning server as described herein includes an AP coordination module configured to select a first set of APs to take first positioning measurements from a mobile device, to obtain the first positioning measurements from the first set of APs, to select, based on the first positioning measurements, a second set of APs to take second positioning measurements from the mobile device, and to obtain the second positioning measurements from the second set of APs; and a positioning engine communicatively coupled to the AP coordination module and configured to determine a location of the mobile device based on the first positioning measurements and the second positioning measurements.

An example of an apparatus that facilitates network-based positioning of a mobile device as described herein includes means for selecting a first set of APs to take first positioning measurements from the mobile device; means for obtaining the first positioning measurements from the first set of APs; means for selecting, based on the first positioning measurements, a second set of APs to take second positioning measurements from the mobile device; means for obtaining the second positioning measurements from the second set of APs; and means for determining a location of the mobile device based on the first positioning measurements and the second positioning measurements.

Another example of a positioning server as described herein includes a memory storing instructions; and at least one processor communicatively coupled to the memory and configured to execute the instructions. The instructions, when executed by the at least one processor, cause the at least one processor to select a first set of APs to take first positioning measurements from a mobile device; obtain the first positioning measurements from the first set of APs; select, based on the first positioning measurements, a second set of APs to take second positioning measurements from the mobile device; obtain the second positioning measurements from the second set of APs; and determine a location of the mobile device based on the first positioning measurements and the second positioning measurements.

Items and/or techniques described herein may provide one or more of the following capabilities, as well as other capabilities not mentioned. Access point (AP) selection for NBP is conducted according to an improved multi-pass approach, which reduces the number of APs used for positioning as well as overall network loading. Additionally, the amount of measurements associated with device positioning is reduced, which in turn results in reduced network load and increased network efficiency. A distributed arrangement of APs within an area is utilized for initial positioning operations, increasing the accuracy of estimated coarse positions. The techniques described herein may also be applied independent of specific AP deployments, thereby increasing network versatility. Other capabilities may be provided and not every implementation according to the disclosure must provide any particular capability, let alone all of the capabilities, discussed. Further, it may be possible for an effect noted above to be achieved by means other than that noted, and a noted item/technique may not necessarily yield the noted effect.

DETAILED DESCRIPTION

Described herein are systems and methods that provide a measurement scheme (e.g., for received signal strength indication (RSSI) measurements, round trip time (RTT) measurements, etc.) for network-based positioning. For example, an iterative AP selection technique is employed to select the APs that will be used to exchange signaling with a mobile device during positioning. The iterative AP selection technique is performed in multiple (two or more) stages. During the first stage, an initial set of APs is chosen to engage in a signaling exchange the mobile device in order to obtain a rough estimated position of the mobile device. As only a rough position is obtained during this first stage, the APs chosen to perform the measurements for the first stage may utilize an abbreviated signaling exchange that causes reduced network loading. Based on the rough position of the mobile device as determined at the first stage, a targeted set of APs located near the mobile device are chosen to engage in a further signaling exchange with the mobile device in subsequent stages. In doing so, the iterative AP selection techniques described herein may reduce the number of APs used for positioning as well as account for the relative positions of APs during AP selection.

While various implementations described herein may refer to network elements and/or utilize nomenclature specific to one or more network technologies, the techniques described herein are not limited to a specific technology and may be applied to any suitable technology or combination thereof, whether presently existing or developed in the future. Further, some of the implementations described herein may also be applied to mobile-based positioning (MBP) systems, and/or other systems.

Figure 1:
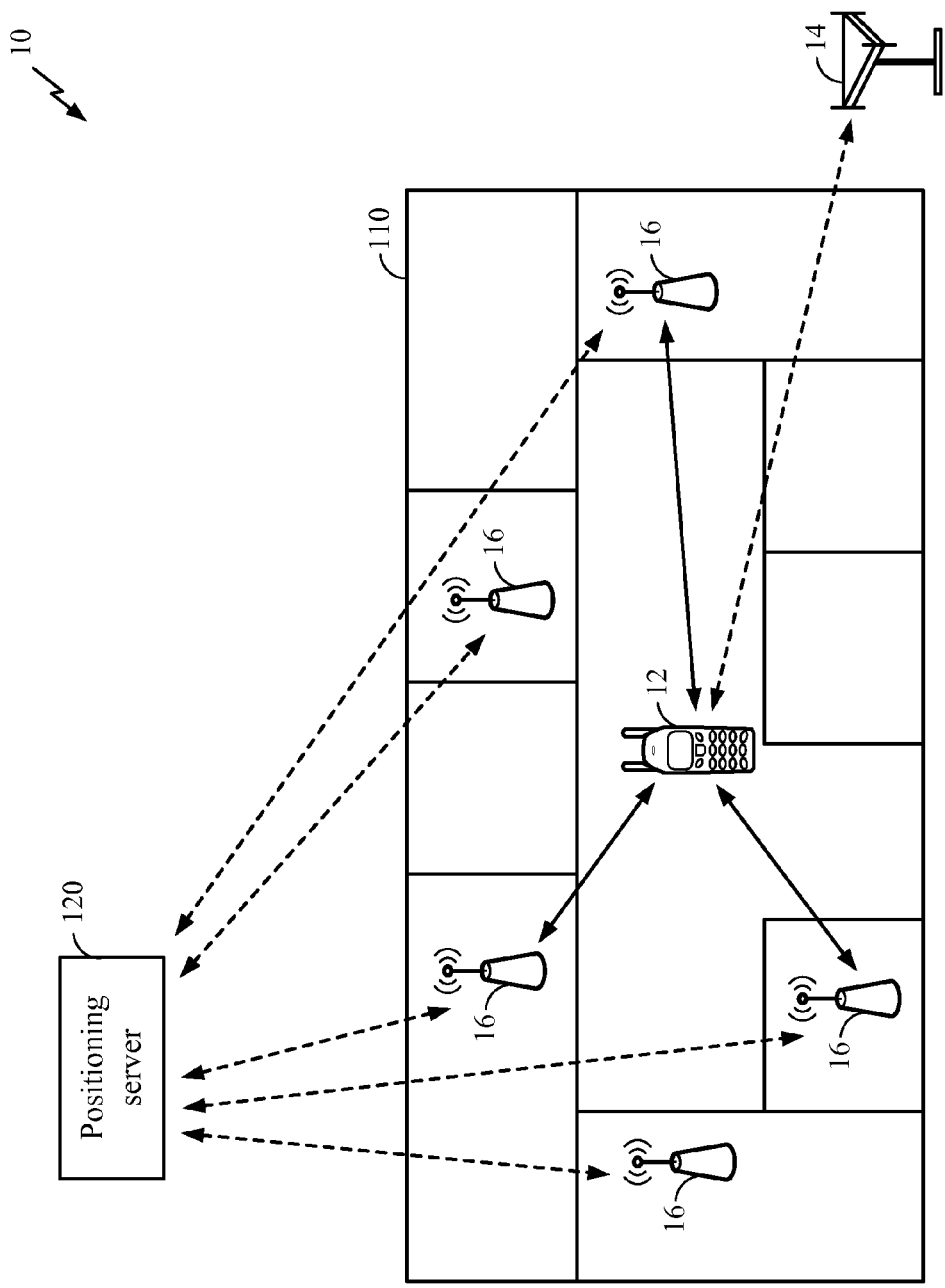
FIG. 1 is a schematic diagram of a wireless communication environment associated with an indoor region.

Systems and methods described herein operate via one or more mobile devices operating within a wireless communication system. Referring to FIG. 1, an example wireless communication system 10 includes a mobile device 12, a base transceiver station (BTS) 14 and wireless access points (APs) 16 in communication with the mobile device 12, and a positioning server 120 in communication with the APs 16. Although only one BTS 14 and one mobile device 12 are shown in FIG. 1, more than one BTS 14 could be used. The BTS 14 and APs 16 provide communication service for a variety of wireless communication devices, referred to herein as mobile devices, although only the one mobile device 12 is shown in FIG. 1 and referred to below. Wireless communication devices served by the BTS 14 and/or AP 16 can include, but are not limited to, personal digital assistants (PDAs), smartphones, computing devices such as laptops, desktops or tablet computers, automobile computing systems, etc., whether presently existing or developed in the future.

The system 10 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTS 14 and APs 16 can wirelessly communicate with the mobile device 12 in the system 10 via antennas. The BTS 14 may also be referred to as a base station, a Node B, an evolved Node B (eNB), etc. The APs 16 may also be referred to as access nodes (ANs), hotspots, etc. The BTS 14 is configured to communicate with the mobile device 12 via multiple carriers. The BTS 14 can provide communication coverage for a respective geographic area, such as a cell. The cell of the BTS 14 can be partitioned into multiple sectors as a function of the base station antennas.

The BTS 14 may be a macro base station or a base station of a different type, e.g., a macro, pico, and/or femto base station, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

While both the BTS 14 and APs 16 are shown in the system 10, a wireless communication environment need not contain both BTSs 14 and APs 16, and may include only BTSs 14, only APs 16, or both BTSs 14 and APs 16, in any number or configuration. Generally, the BTS 14 supports communication via one or more cellular radio access technologies such as Global System for Mobile Communication (GSM), Universal Mobile Telecommunications System (UMTS), Long Term Evolution (LTE) and/or other technologies developed by the Third Generation Partnership Project (3GPP), CDMA2000 and/or other technologies developed by 3GPP2, etc. An AP 16 generally supports communication via one or more technologies based on the IEEE (Institute of Electrical and Electronics Engineers) 802.11 specifications (e.g., Wi-Fi) or the like. However, the BTS 14 and APs 16 are not limited to these technologies and may employ additional or alternative functionality. Further, a single device may include some or all functionality of both the BTS 14 and the APs 16.

As further shown in system 10, the mobile device 12 is positioned within a venue (area, region) 110 such as a shopping mall, a school, or other indoor or outdoor area. Here, the APs 16 are positioned within the venue 110 and provide communication coverage for respective areas (rooms, stores, etc.) of the venue 110. Access to the APs 16 in the system 10 may be open, or alternatively access can be secured with a password, encryption key or other credentials.

While FIG. 1 illustrates only the one mobile device 12, the system 10 may further include multiple mobile devices, which may be dispersed throughout the system 10. Mobile devices may be referred to as terminals, access terminals (ATs), mobile stations, user equipment (UE), subscriber units, etc. Further, mobile devices can include various devices as listed above and/or any other devices.

The system 10 may also implement NBP to facilitate positioning of the mobile device 12 in the region 110. In some use cases, NBP may be desirable over MBP in order to provide positioning for a wider range of devices, e.g., devices having MBP functionality as well as devices lacking the equipment and/or processing capability to implement MBP functionality. Alternatively, a combination of NBP, MBP, and/or other positioning techniques could be used in the system 10.

Here, NBP is coordinated through the positioning server 120. The positioning server 120 maintains a communications link, referred to as a backhaul link, with the APs 16 in the system 10. The backhaul link is generally a wired communication link (e.g., Ethernet, etc.), although wireless communication and/or other communication technologies could be used. The positioning server 120 coordinates the collection of measurements performed by the APs relating to positioning-related messages communicated between the APs 16 and the mobile device 12. The collected measurements are, in turn, used to obtain a position of the mobile device 12.

Figure 2:
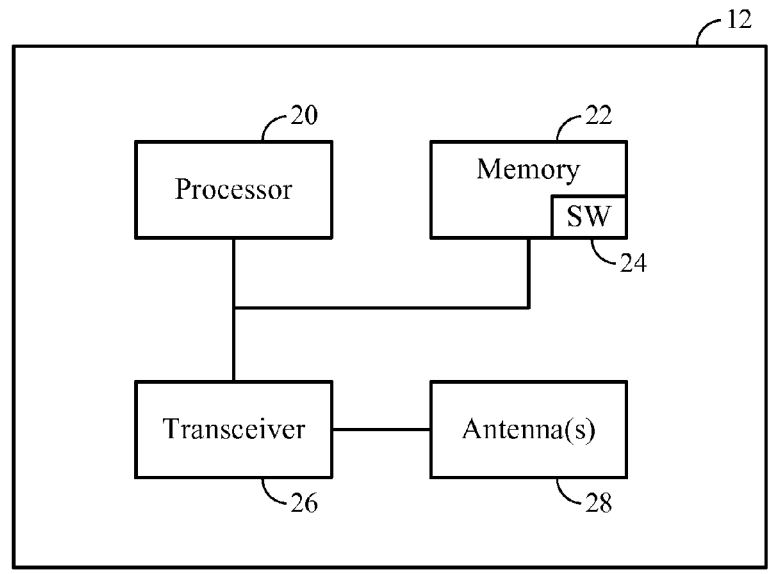
FIG. 2 is a block diagram of components of one embodiment of a mobile station shown in FIG. 1.

Referring next to FIG. 2, an example of the mobile device 12 comprises a computer system including a processor 20, memory 22 including software 24, a transceiver 26, and antennas 28. The transceiver 26 provides, via the antennas 28, bi-directional communication functionality to other entities in one or more associated wireless communication networks, here the BTS 14 associated with a cellular network and/or the APs 16 associated with a localized communication network, as shown in FIG. 1. In some implementations, the transceiver 26 may support communication over a variety of communication systems, and different ones of the antennas 28 may be used for different communication systems. For instance, the antennas 28 may include a first antenna for communicating with the BTS 14 and a second antenna for communicating with the APs 16. In other implementations, the antennas 28 used for communication with a given communication system may optionally be further divided into transmit (Tx) antennas and receive (Rx) antennas. Alternatively, respective ones of the antennas 28 can be used for both transmission and reception for an assigned system or combination of systems.

The processor 20 is preferably an intelligent hardware device, e.g., a central processing unit (CPU) such as those made by ARM®, Intel® Corporation, or AMD®, a microcontroller, an application specific integrated circuit (ASIC), etc. The processor 20 could comprise multiple separate physical entities that can be distributed in the mobile device 12. The memory 22 includes random access memory (RAM) and read-only memory (ROM). The memory 22 is a non-transitory processor-readable storage medium that stores software 24 which is processor-readable, processor-executable software code containing processor-readable instructions that are configured to, when executed, cause the processor 20 to perform various functions described herein (although the description may refer only to the processor 20 performing the functions). Alternatively, the software 24 may not be directly executable by the processor 20 but configured to cause the processor 20, e.g., when compiled and executed, to perform the functions. Media that can make up the memory 22 include, but are not limited to, RAM, ROM, FLASH, disc drives, etc.

Figure 3:
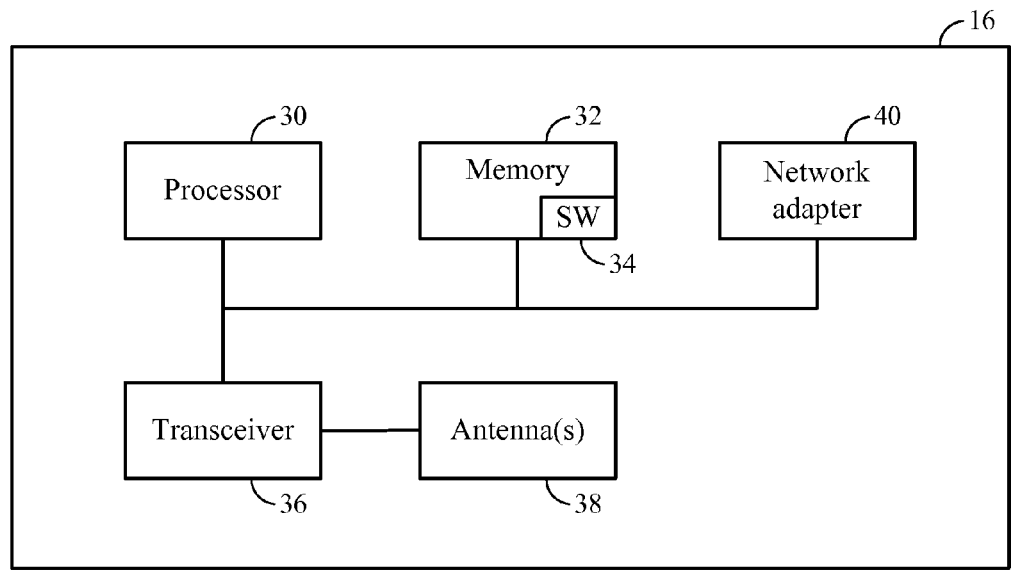
FIG. 3 is a block diagram of components of one embodiment of an access point shown in FIG. 1.

Referring next to FIG. 3, an example one of the APs 16 comprises a computer system including a processor 30, memory 32 including software 34, a transceiver 36, antennas 38, and a network adapter 40. The processor 30 and memory 32 may be similarly structured to the processor 20 and memory 22 of the mobile device 12 shown in FIG. 2. Here, the processor 30 and memory 32 of the AP 16 are configured (e.g., via software 34 stored on the memory 32) to provide communication functionality for the mobile device 12 and/or other devices within communication range of the AP 16. The AP 16 communicates with the mobile device 12, other ones of the APs 16, and/or other entities in the system 10 via antennas 38 associated with the transceiver 36 according to one or more communications protocols. Similar to the antennas 28 of the mobile device 12, the antennas 38 of the AP 16 may be divided into Tx and Rx antennas, antennas for multiple communication systems supported by the transceiver 36, etc.

The network adapter 40 of the AP 16 maintains a backhaul link (e.g., an Ethernet link, etc.) to the positioning server 120 and facilitates communication between the AP 16 and the positioning server 120 over the backhaul link. Alternatively, the AP 16 may maintain a wireless communication link with the positioning server 120 via the transceiver 36 and antennas 38, in which case the network adapter 40 may be omitted and/or implemented by the transceiver 36.

Figure 4:
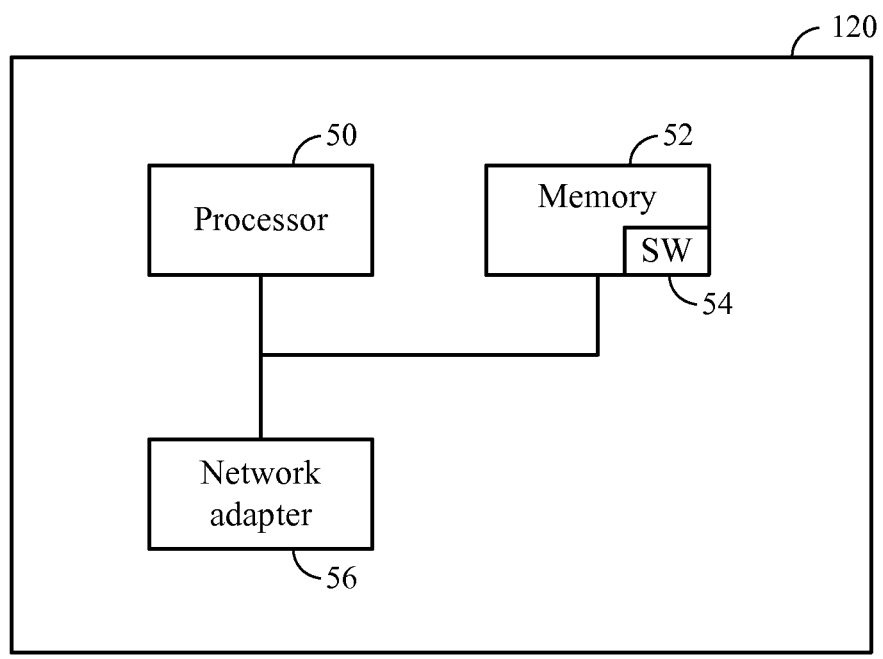
FIG. 4 is a block diagram of components of one embodiment of a positioning server shown in FIG. 1.

Referring to FIG. 4, an example of the positioning server 120 comprises a computer system including a processor 50, memory 52 including software 54, and a network adapter 56. The processor 50 and memory 52 may be similarly structured to the processor 20 and memory 22 of the mobile device 12 shown in FIG. 2 and/or the processor 30 and memory 32 of the AP 16 shown in FIG. 3. Here, the processor 50 and memory 52 of the positioning server 120 are configured (e.g., via software 54 stored on the memory 52) to provide NBP for the mobile device 12 by coordinating the performance of measurements at the APs 16 related to positioning-related messages transmitted between the APs 16 and the mobile device 12 and utilizing these measurements to determine the position of the mobile device 12. As discussed above, the positioning server 120 communicates with the APs 16 over a backhaul link using the network adapter 56 and/or other means, such as a transceiver and associated antennas (not shown).

Figure 5:
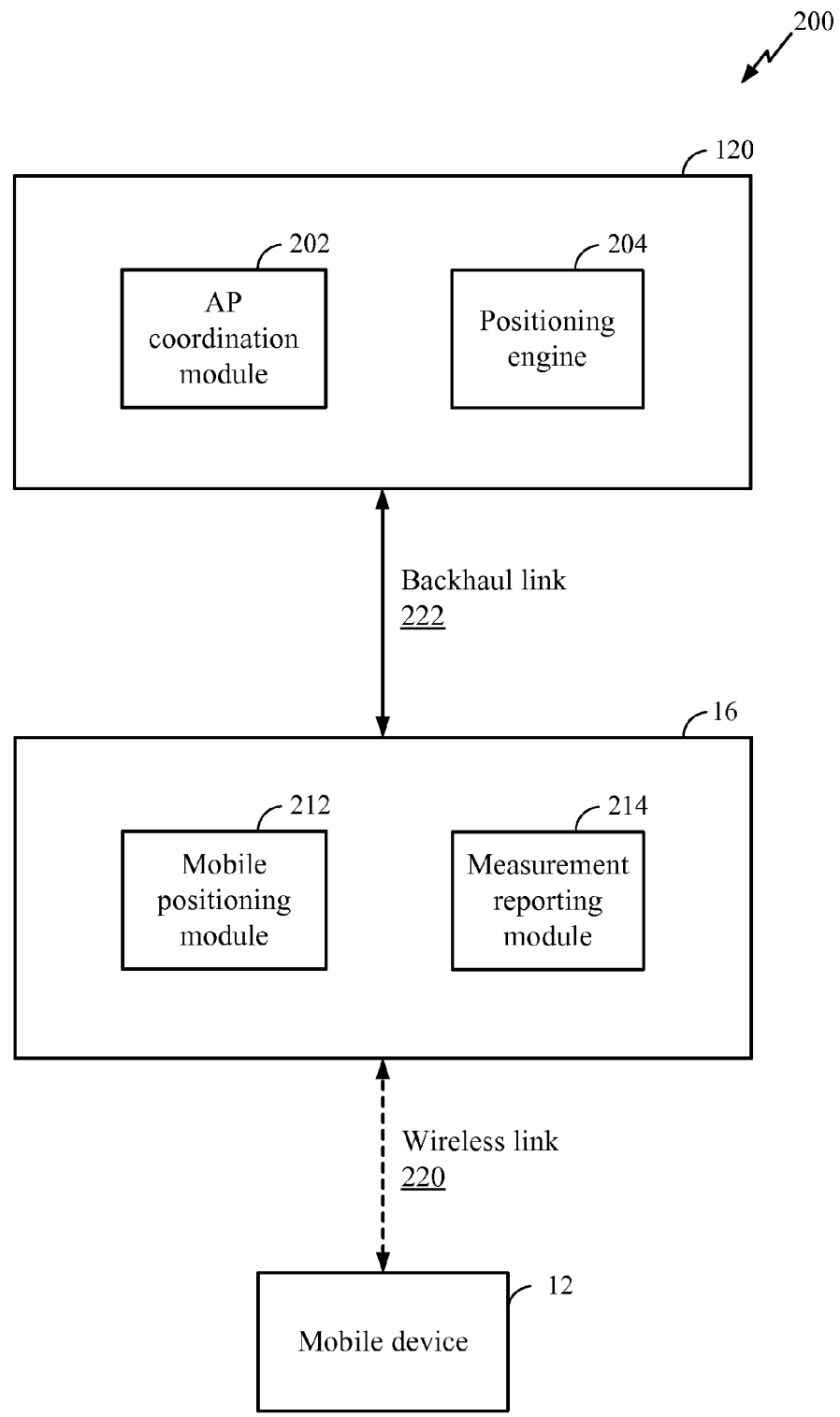
FIG. 5 is a functional block diagram of one embodiment of an NBP system.

FIG. 5 shows a high-level overview of an NBP implementation in a system 200 utilizing the mobile device 12, one or more of the APs 16, and the positioning server 120. Here, the mobile device 12 is in range of one or more of the APs 16, and the mobile device 12 is operable to communicate with one or more of the APs 16 via a wireless link 220. While only one of the APs 16 is shown in FIG. 5 for simplicity, the system 200 preferably includes multiple ones of the APs 16 (e.g., three or more APs, etc.). The APs 16, in turn, communicate with the positioning server 120 over a backhaul link 222.

The positioning server 120 as shown in FIG. 5 includes an AP coordination module 202 and a positioning engine 204. The AP 16 shown in FIG. 5 includes a mobile positioning module 212 and a measurement reporting module 214. The functionality of the respective modules 202, 204, 212, 214 of the positioning server 120 and AP 16 are described in further detail below.

Upon NBP being requested for the mobile device 12 (e.g., via an application or other means associated with the mobile device 12, or by the AP 16 and/or positioning server 120 with user authorization), the AP coordination module 202 of the positioning server 120 selects one or more of the APs 16 that are within range of the mobile device 12 to initiate a positioning exchange with the mobile device 12. The mobile positioning module 212 of the AP 16 initiates this exchange with the mobile device 12 and performs measurements, such as RTT measurements, RSSI measurements, or the like, based on signals transmitted to and received from the mobile device 12 during the exchange. The measurement reporting module 214 of the AP 16 reports these measurements back to the positioning server 120, which utilizes the positioning engine 204 to determine the position of the mobile device 12, e.g., using trilateration, based on the reported measurements and known locations of the APs 16. The determined position may then, in turn, be transmitted from the positioning server 120 to the APs 16 and/or the mobile device 12 (either from the positioning server 120 directly to the mobile device 12 or indirectly to the mobile device 12 via one of the APs 16 or another entity in communication with the mobile device 12).

The modules 202, 204 of the positioning server 120 and the modules 212, 214 of the AP 16 shown in FIG. 5 may be implemented in hardware, software, (e.g., implemented by the processors 30, 50, respectively, executing the respective software 34, 54 stored on the memories 32, 52, respectively), a combination of hardware and software, and/or by any other suitable means.

The positioning server 120 implements an AP selection algorithm to select the APs 16 that collect positioning measurements for the mobile device 12. The AP selection algorithm is structured and utilized in view of a variety of criteria. These may include, but are not limited to the following. First, the APs 16 may be chosen to reduce (or even minimize) HDOP (horizontal dilution of precision). This may be achieved by choosing the APs 16 that are around the mobile device 12 being tracked. Second, the APs 16 may be chosen to reduce the number of the APs 16 selected and the number of measurement frames transmitted by each of the APs 16. Reduced measurement load can improve scalability, among other benefits. Third, the APs 16 may be chosen independently of how the APs 16 are deployed and/or configured within the area.

Figure 6:
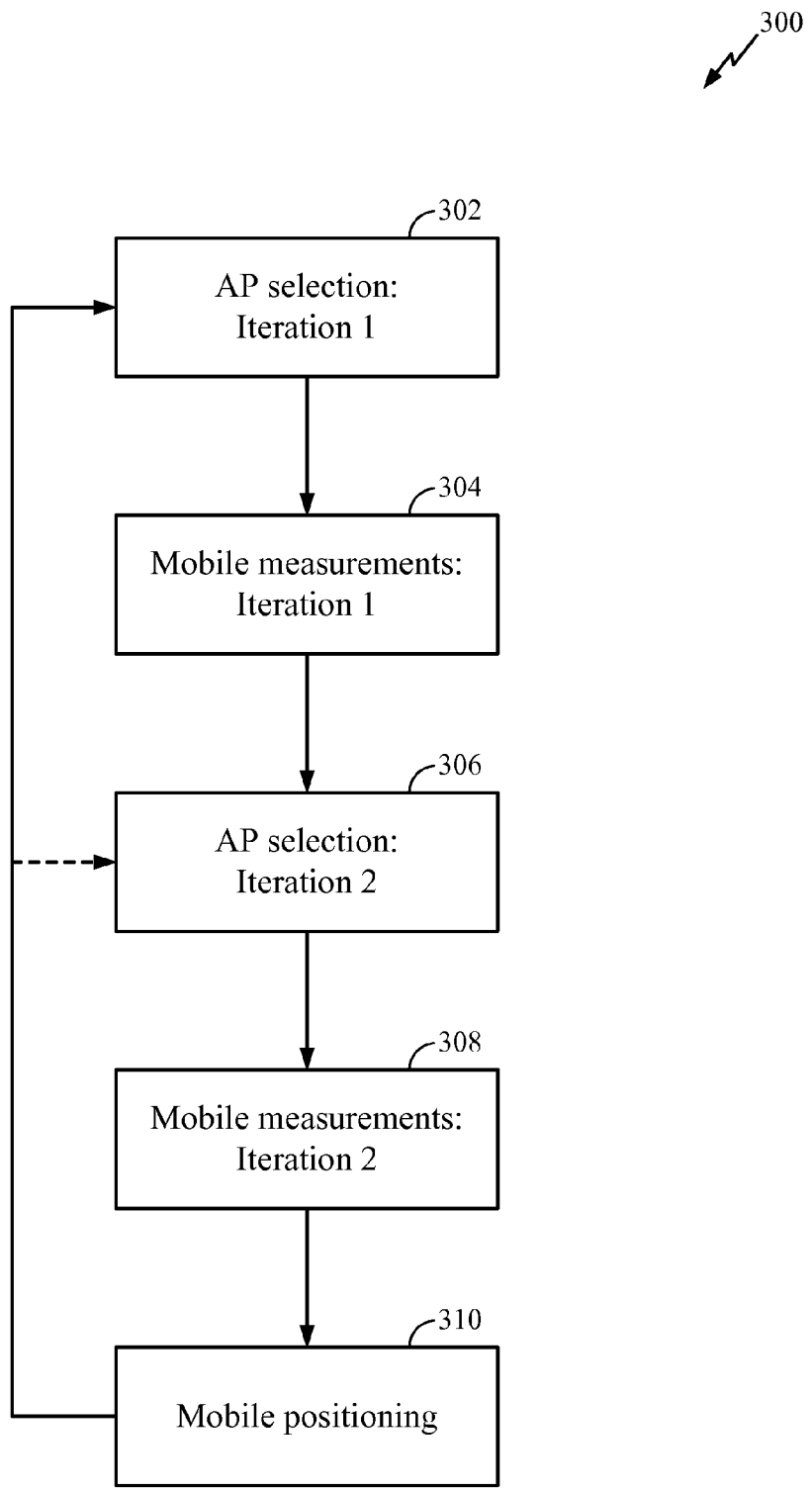
FIG. 6 is a generalized flow diagram of a process for iterative AP selection and mobile positioning in an NBP system.

A high level overview of an iterative process 300 for AP selection and mobile positioning for an NBP system is shown by FIG. 6. Here, AP selection is performed in multiple (e.g., two) iterations. The first iteration includes a first AP selection stage 302 and a first mobile measurement stage 304, and the second iteration includes a second AP selection stage 306 and a second mobile measurement stage 308. The process 300 further includes a mobile positioning stage 310. After the mobile positioning stage 310, the process 300 may return to either the first or the second iteration, e.g., the first AP selection stage 302 or the second AP selection stage 306, respectively. These stages are described in further detail below.

In general, the first AP selection stage 302 results in a selection of the APs 16 to be used for determining a coarse position of the mobile device 12. The APs 16 selected during the first iteration are scheduled to take a relatively small number of measurements from the mobile device 12 at the first mobile measurement stage 304. Positioning measurements (e.g., RSSI and RTT measurements) taken during the first mobile measurement stage 304 may be coarse, low-accuracy measurements.

Based on the measurements (e.g., RSSI/RTT, etc.) taken by the APs 16 selected in the first iteration, a second list of the APs 16 is chosen during the second AP selection stage 306. During the second mobile measurement stage 308, the APs selected during the second AP selection stage 306 take additional positioning measurements (e.g., RSSI, RTT, etc.) from the mobile device 12. These measurements are, in turn, used to obtain a precise position estimate of the mobile device 12 during the mobile positioning stage 310. The measurements obtained during the second mobile measurement stage 308 may also be combined at the mobile positioning stage 310 with the measurements collected during the first mobile measurement stage 304.

Initial AP Selection (First Iteration)

The first iteration of AP selection detects the coarse position of the mobile device 12. If the last position of the mobile device 12 is already known and is reliable, then the first iteration can be skipped since the coarse position of the mobile device 12 is already known. Thus, the initial AP selection algorithm may depend upon the information available about the mobile device 12.

If the AP 16 to which the mobile device 12 is connected is already known, this AP 16 is designated as a "connected AP" for the mobile device 12. Alternatively, if the mobile device 12 is not associated with any of the APs 16, then one of the APs that is able to sense packets transmitted by the mobile device 12 may be determined and used in place of a connected AP.

Figure 7:
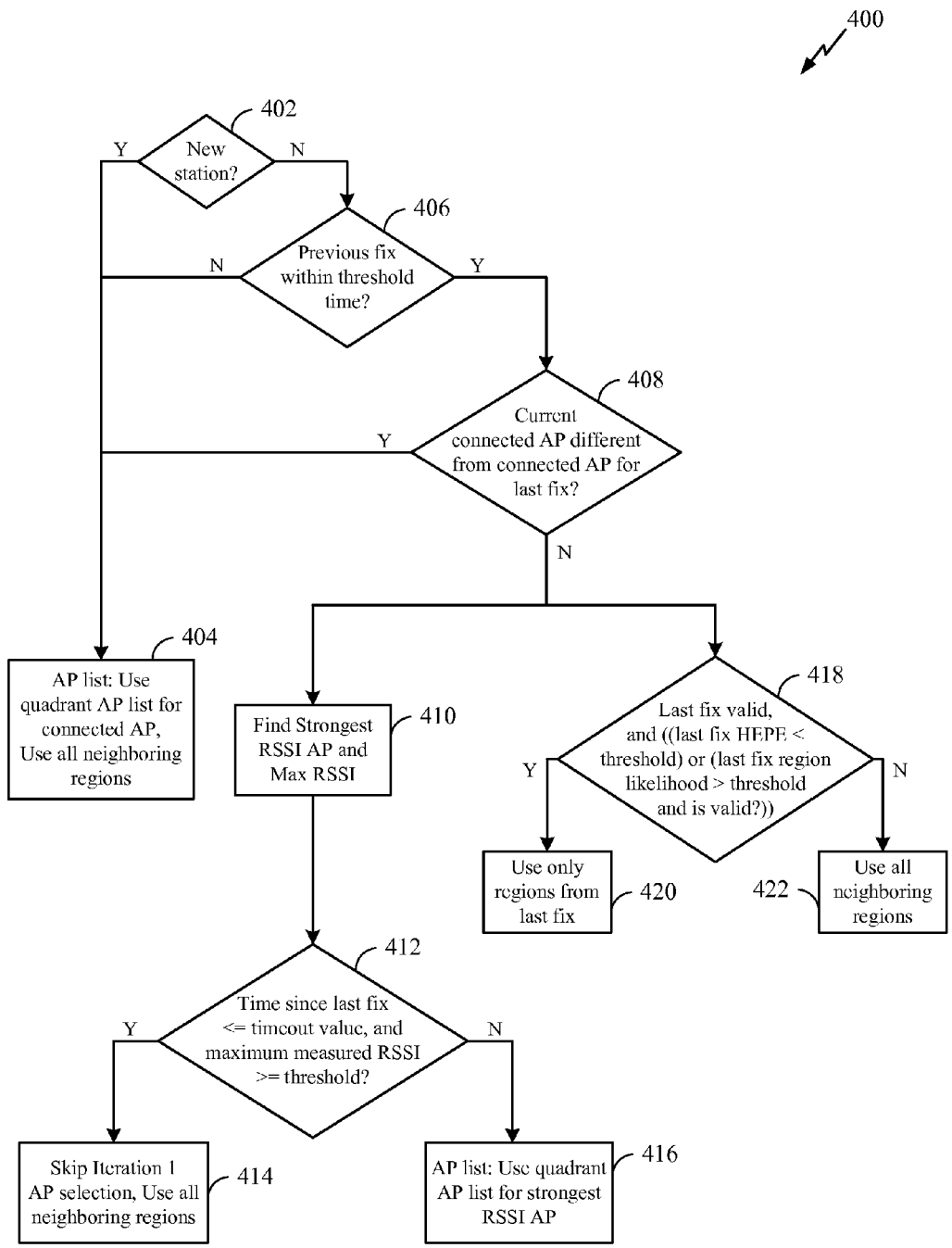
FIG. 7 is a block flow diagram of a process for initial AP selection in an NBP system.

An example of the initial AP selection algorithm is shown by process 400 in FIG. 7. The process 400 is described below, with reference being made to the relevant stages shown in the process 400. While specific parameter names are given in the below description, these parameter names are used for purposes of description only and are not limiting.

The process 400 begins at stage 402, where an inquiry is made by the positioning server 120 (e.g., via the AP coordination module 202 or the positioning engine 204) as to whether the mobile device 12 whose position is to be determined is a new device, i.e., for which no position has previously been determined. For example, the AP coordination module 202 of the positioning server 120 may determine that the position of the mobile device 12 is to be determined and analyzes the memory 52 to determine whether the position of the mobile device 12 has been determined previously. If the positioning engine 204 finds previous position fix information for the mobile device 12, then the process 400 proceeds to stage 404. If the positioning engine does not find a previous position fix for the mobile device 12, then the process 400 proceeds to stage 406.

AP Selection for New Device

If the mobile device 12 is determined to be a new device at stage 402, AP selection for the mobile device 12 is conducted at stage 404 as follows. Initially, the AP 16 to which the mobile device 12 is connected, i.e., the connected AP 16 for the mobile device 12, is determined. The connected AP 16 for the mobile device 12 may be determined based on information periodically sent by each of the APs 16 to the positioning server 120 (e.g., as part of the NBP protocol). This information may include a list of mobile devices connected to the AP 16 along with the time the mobile devices were last seen and the estimated RSSIs from the mobile devices.

As shown at stage 404, the AP coordination module 202 uses the connected AP 16 for the mobile device 12 and the RSSI of the mobile device 12 at the connected AP 16 as a basis by which the APs 16 that will take measurements from the mobile device 12 are selected. As an alternative to the operations shown at stage 404, if multiple ones of the APs 16 report a valid RSSI estimate of the mobile device 12, then the APs 16 that will take measurements from the mobile device 12 may be selected based on the AP 16 which indicates a maximum RSSI instead of the connected AP 16. For simplicity, the AP 16 that is utilized as a basis for AP selection (i.e., the connected AP 16 or an alternative AP 16 that is selected as described above) is referred to herein as a "central AP."

As another alternative to the operations shown at stage 404, the AP coordination module 202 may check if the RSSI of the mobile device 12 at the central AP 16 is available and is not older than a configurable timeout interval MS_measurements_stale_timeout. If these criteria are satisfied, and the RSSI is greater than a configurable threshold MS_strong_RSSI_threshold, then the AP coordination module 202 may determine that the mobile device 12 is close to the central AP 16 and skip the first iteration of AP selection. If the RTT from the mobile device 12 to the central AP 16 is available, the RTT may be used in addition to, or in place of, the RSSI in the above determination.

If the AP coordination module 202 determines that the RSSI of the mobile device 12 is less than the threshold, then the AP coordination module 202 chooses for measurement a list of the APs 16 that neighbor the central AP 16, herein referred to as a "quadrant AP list" or "short range reduced AP list." The structure of the quadrant AP list is described in further detail below. As further discussed below, the AP coordination module 202 may utilize the RSSI of the mobile device 12 at the central AP 16 in generating the quadrant AP list for the mobile device 12.

As further shown at stage 404, since there is no area information available for the new mobile device 12, the AP coordination module 202 includes all of the regions neighboring the central AP 16 for the first iteration of AP selection. Here, the list of neighboring regions includes all the regions that satisfy minimum distance criteria and are a configurable parameter MS_neighboring_level levels (e.g., building floors) above and/or below the region in which the central AP 16 is located. The parameter MS_neighboring_level may be different for different ones of the APs 16, and may be predetermined based on the connectivity graph of the venue, positions of the APs 16, and/or other information available about the venue.

The quadrant AP list is determined by the AP coordination module 202 for all of the APs 16, either at initialization or on a change in operating status of one of the APs 16. The quadrant AP list algorithm uses a short range AP list to determine a corresponding quadrant AP list. Short range and quadrant AP lists are defined in the following sections.

Short Range AP List

The short range AP list is used by the AP coordination module 202 to compute the quadrant AP list. The short range AP list may or may not be stored at the positioning server 120 (e.g., in an AP database associated with the AP coordination module 202, and/or another database structure associated with the positioning server 120). The AP coordination module 202 generates neighboring AP lists using the RSSIs of respective ones of the APs 16 at the positions of respective others of the APs 16. These neighboring AP lists are, in turn, used to create the short range AP list.

The AP coordination module 202 computes the short range AP list for a region corresponding to the central AP 16 as well as for other neighboring regions. For the region of the central AP 16, the AP coordination module 202 generates the short range AP list as the list of APs 16 in the same region as the central AP 16 having an RSSI at the location of the central AP 16 greater than or equal to a configurable threshold MS_short_range_AP_RSSI.

For respective ones of the regions neighboring the region of the central AP 16, the AP coordination module 202 generates the short range AP list by first determining the relative RSSI, $RSSI_{Relative}$, of the APs 16 in the neighboring region with respect to the central AP 16. More particularly, the positioning server 120 computes $RSSI_{Relative}$ for one of the APs 16 by finding the projection of the location of the central AP 16 on the neighboring region and determining the RSSI of the respective AP 16 of the neighboring region at the projected position in the region of the central AP 16. Alternatively, if there is no projection of the location of the central AP 16 on the visible neighboring region, the positioning server may instead find the projection of the location of the AP 16 of the neighboring region on the region of the central AP 16 and determine $RSSI_{Relative}$ as the RSSI of the central AP at the projected position in the neighboring region. Once the positioning server 120 has determined the relative RSSIs as described above, the positioning server then generates a list of the APs 16 in the neighboring regions with relative RSSI $RSSI_{Relative}$ greater than or equal to a configurable parameter MS_Short_Range_AP_RSSI.

Quadrant AP List

The AP coordination module 202 generates a quadrant AP list for one of the APs 16 by using the RSSIs and locations of different ones of the APs 16 relative to the AP 16 for which the list is generated. The quadrant AP list includes a set of the APs 16 per region. Here, the quadrant AP list includes five of the APs 16—a "master" AP 16, i.e., the AP for which the quadrant AP list is generated, and four other APs 16 each located in respective quadrants around the master AP 16. However, the quadrant AP list could also include more or less than five APs. For instance, a spatial partitioning other than quadrants could be applied to the master AP 16 such that there could be any number of partitions around the master AP 16, each region being associated with one of the APs 16 in the list. These partitions may be defined according to boundaries radially extending from the position of the master AP 16 and/or defined in any other suitable manner.

For the region of the central AP 16, the quadrant AP list includes the central AP 16 and four others of the APs 16, one in each quadrant around the central AP 16. For other neighboring regions, the quadrant AP list includes the one of the APs 16 having a strongest relative RSSI with respect to the central AP 16 and 4 others of the APs 16 with relative positions corresponding to each quadrant around the strongest RSSI AP 16.

The AP coordination module 202 generates the quadrant AP list based on the short range AP list. When the number of the APs 16 in the short range AP list for a region is less than equal to a configurable parameter MS_minSRR_AP_Cnt, the AP coordination module 202 uses the full short range AP list as the quadrant AP list (short range reduced AP list).

Alternatively, when the number of the APs 16 in the short range AP list for a region is more than MS_minSRR_AP_Cnt, the AP coordination module 202 finds the relative RSSI ($RSSI_{Relative}$) and position ($x_{relative}$,$y_{relative}$) of each of the APs 16 in the short range AP list with respect to the central AP 16 as follows. First, the AP coordination module 202 finds the projection of the location of the central AP 16 on the region under consideration, e.g., ($x_{central\ AP\ region}$,$y_{central\ AP\ region}$). Next, the AP coordination module 202 finds the position of each of the APs 16 in the short range AP list for the region under consideration, relative to the central AP position, based on the following equation:

$$(x_{relative}, y_{relative}) = (x_{AP} - x_{central\ AP\ region}, y_{AP} - y_{central\ AP\ region}),$$

where ($x_{central\ AP\ region}$,$y_{central\ AP\ region}$) are the coordinates of the projection of the central AP 16 on the region under consideration, ($x_{AP}$,$y_{AP}$) are the coordinates of the neighboring AP 16, and ($x_{relative}$,$y_{relative}$) are the relative coordinates of the neighboring AP 16 with respect to the central AP 16. When there is no projection of the location of the central AP 16 on the neighboring region, the AP coordination module 202 may instead find the projection of the APs 16 in the short range AP list on the region of the central AP 16, e.g., ($x_{AP\ region}$, $y_{AP\ region}$). Finally, the AP coordination module 202 finds the position of each of the APs 16 in the short range AP list for the region under consideration, relative to the position of the central AP 16, as follows:

$$(x_{relative}, y_{relative}) = (x_{AP\ region} - x_{central\ AP}, y_{AP\ region} - y_{central\ AP}),$$

where ($x_{central\ AP}$,$y_{central\ AP}$) are the coordinates of the central AP 16, ($x_{AP\ region}$,$y_{AP\ region}$) are the coordinates of the projection of the neighboring AP 16 on the region of the central AP 16, and ($x_{relative}$,$y_{relative}$) are the relative coordinates of the neighboring AP 16 with respect to the central AP 16.

Based on the relative positions of the APs 16, the AP coordination module 202 then divides the neighboring AP list into multiple sectors. Here, eight sectors are used, each associated with a 45-degree angle radially extending from the position of the central AP 16 and numbered counterclockwise, although different sector definitions and/or naming conventions could be used. The sectors used in the above example are defined as follows:

Sector 1: APs with $x_{relative}>0$, $y_{relative}>=0$ and $|x_{relative}|>|y_{relative}|$ Sector 2: APs with $x_{relative}>0$, $y_{relative}>0$ and $|x_{relative}|<=|y_{relative}|$ Sector 3: APs with $x_{relative}<=0$, $y_{relative}>0$ and $|x_{relative}|<|y_{relative}|$ Sector 4: APs with $x_{relative}<0$, $y_{relative}>0$ and $|x_{relative}|>=|y_{relative}|$ Sector 5: APs with $x_{relative}<0$, $y_{relative}<=0$ and $|x_{relative}|>|y_{relative}|$ Sector 6: APs with $x_{relative}<0$, $y_{relative}<0$ and $|x_{relative}|<=|y_{relative}|$ Sector 7: APs with $x_{relative}>=0$, $y_{relative}<0$ and $|x_{relative}|<|y_{relative}|$ Sector 8: APs with $x_{relative}>0$, $y_{relative}<0$ and $|x_{relative}|>=|y_{relative}|$ In each of the sectors, the AP coordination module 202 finds the AP 16 with the weakest relative RSSI that is greater than a configurable parameter MS_sector_RSSI_thresh. If none of the APs 16 in the sector satisfies these criteria, the AP 16 with the strongest relative RSSI in the sector is chosen.

If the quadrant AP list is being generated for the region of the central AP 16, the AP coordination module 202 adds the central AP 16 to the list. Similarly, the AP coordination module 202 selects the neighboring APs 16 for each neighboring region. If the quadrant AP list is being generated for a neighboring region, the AP coordination module 202 adds the AP 16 from the neighboring AP list which has the strongest relative RSSI with respect to the central AP 16, provided it is not already added to the quadrant AP list.

Figure 8:
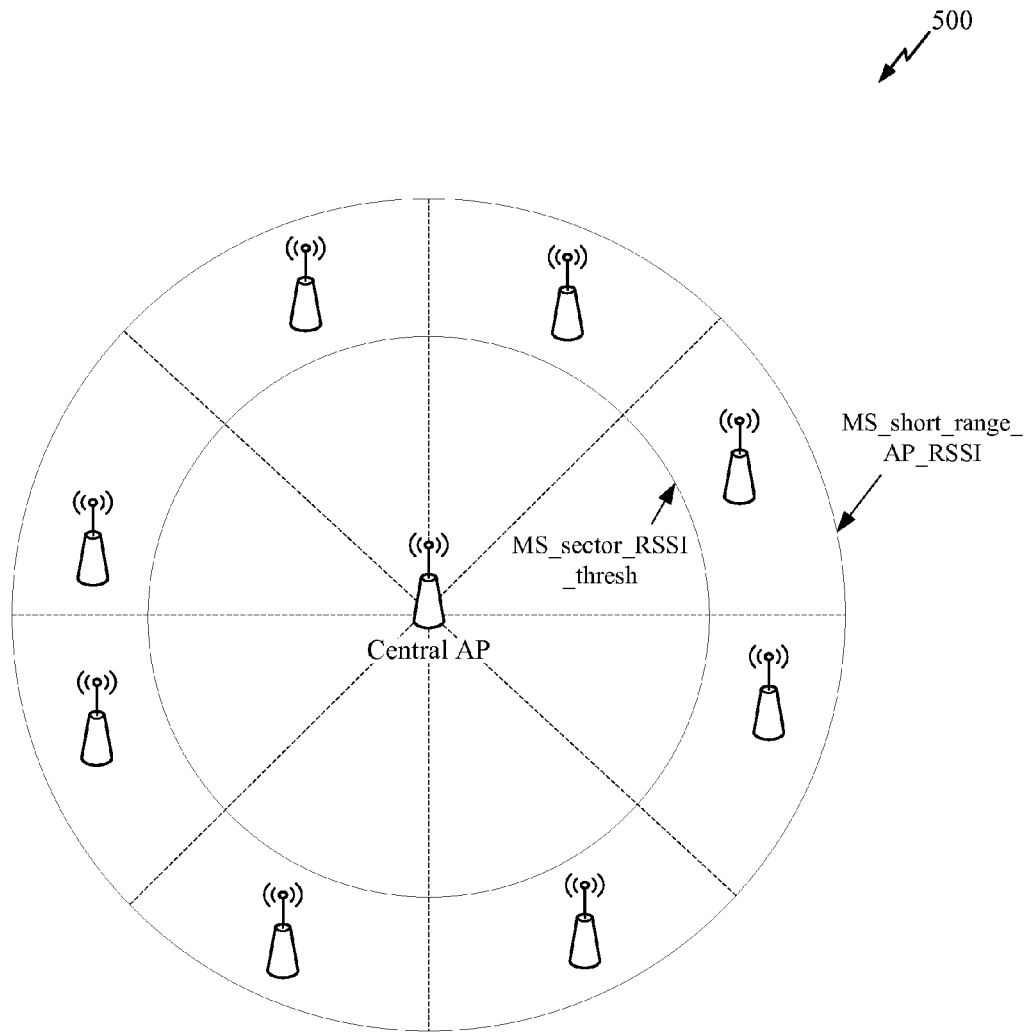
FIGS. 8-12 are illustrative views of respective AP selection functions performed in connection with the process shown in FIG. 6.

Diagram 500 in FIG. 8 is an example of a quadrant AP list selected by the AP coordination module 202 for a region corresponding to the central AP 16. The quadrant AP list may be further filtered by using one or more methods, e.g., a method based on relative distance between neighboring ones of the APs 16 and/or a method based on relative RSSI between neighboring ones of the APs 16. These are described in further detail below.

Figure 9:
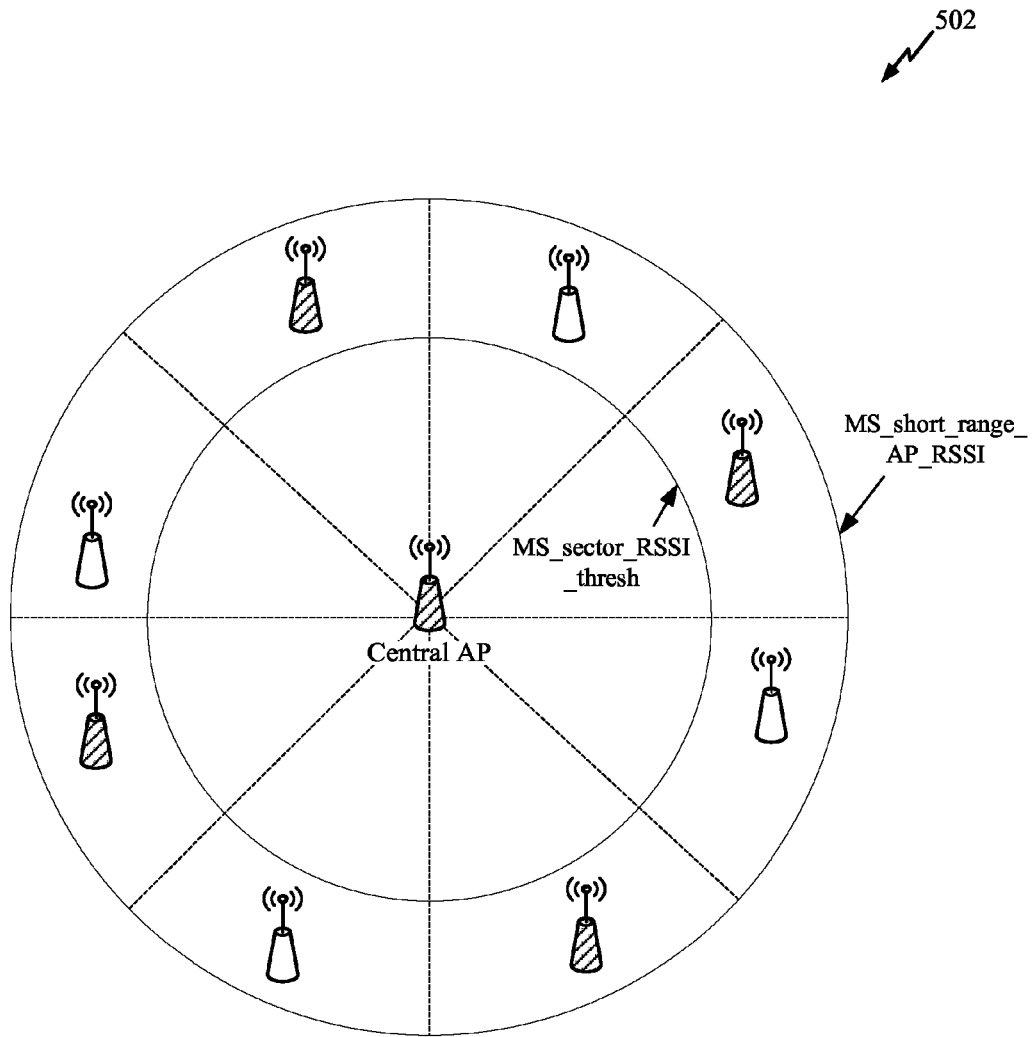

Diagram 502 in FIG. 9 shows a group of APs 16 selected by the AP coordination module 202 using the distance-based method, where the selected ones of the APs 16 are denoted with line shading. Here, the AP coordination module 202 first selects four of the APs 16—one from each alternating sector, as shown in diagram 502. This selection results in two groups of four APs 16 each, corresponding to the shaded and non-shaded APs 16 shown in diagram 502. Next, the AP coordination module 202 compares the strongest RSSI for both groups and selects the group of APs 16 having a strongest RSSI that is less than the strongest RSSI of the other group. If any sectors contain no APs 16, the AP coordination module 202 may choose ones of the APs 16 from both sectors adjacent to any sectors with no APs 16.

Figure 10:
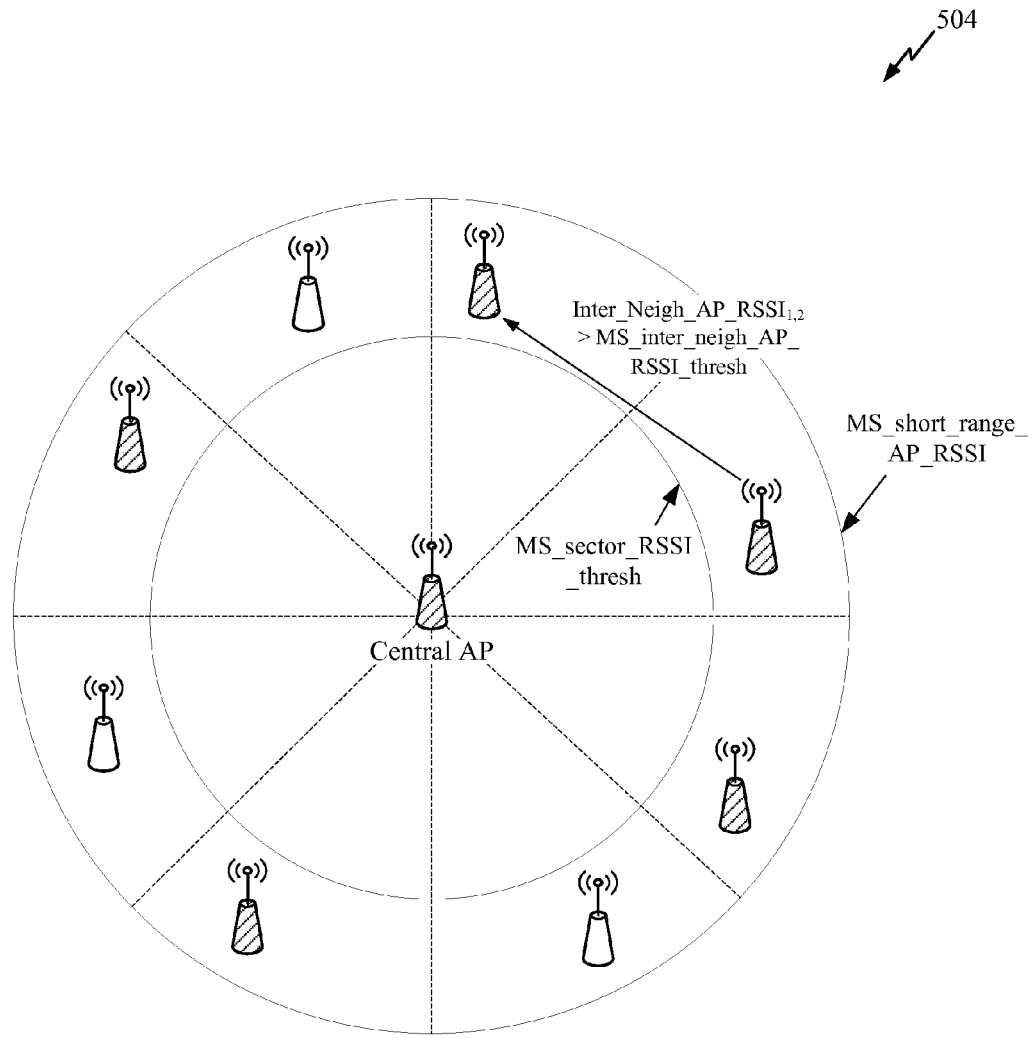

Diagram 504 in FIG. 10 shows a group of APs 16 selected by the AP coordination module 202 using the RSSI-based method. Similar to diagram 502, the selected ones of the APs 16 are denoted in diagram 504 with line shading. Here, the AP coordination module 202 selects the APs 16 from respective sectors such that the RSSI of the APs 16 chosen in each quadrant, at the location of the APs 16 in their neighboring quadrants, is substantially minimized (provided that this RSSI is greater than a configurable threshold MS_inter_neigh_ap_rssi_thresh). If there is no AP 16 in a given sector, the AP coordination module 202 may use APs 16 in one or both adjacent sectors. The AP coordination module 202 obtains the AP list for the RSSI-based method by first selecting one of the APs 16 having a minimum relative RSSI with respect to the central AP 16 and adding this AP 16 to the selected AP list. Next, the AP coordination module 202 finds the RSSI of this AP 16 at the position of the APs 16 in the neighboring sectors. (The RSSI between an AP of sector x and an AP of sector y is referred to herein as Inter_Neigh_AP_RSSI$_{x,y}$.) The AP coordination module 202 chooses the neighboring AP 16 having a minimum Inter_Neigh_AP_RSSI that is greater than a configurable threshold MS_inter_neigh_ap_rssi_thresh and includes this AP 16 in the neighboring AP list. The AP coordination module 202 then iteratively conducts the above steps for respective selected neighboring APs 16 until the list is fully populated. Diagram 504 shows a selection of five of the APs 16, although the number of APs 16 selected by using this algorithm may be more than five. Here, the AP coordination module 202 sorts the sector list in increasing order of angle from the axis, e.g., the sector list is processed counter clockwise. Other orderings could also be used. Additionally, the list of neighboring APs 16 as selected by the AP coordination module 202 using the RSSI method may also depend upon the RSSI of the mobile device 12 at the connected AP 16 and/or other factors.

AP Selection for Old Mobile Device

AP selection for an old mobile device (i.e., the mobile device 12 if previous position fixes for the mobile device 12 exist) may depend upon the position and measurement history of the mobile device 12. Initially, the AP coordination module 202 may retrieve and use various information relating to a previous position fix of the mobile device 12. This information may include, but is not limited to, (1) a position fix for the mobile device 12 (e.g., including x, y coordinates of the mobile device 12 and/or a region in which the mobile device 12 is located); (2) a timestamp of the position fix; (3) whether the previous position fix is valid or invalid (e.g., as determined by information provided by the positioning engine 204); (4) precision and/or error information (e.g., horizontal estimated position error (HEPE)) provided for the position fix; (5) an identity of the one of the APs 16 having a strongest RSSI at the mobile device, along with the RSSI; (6) an identity (e.g., MAC address) of the connected AP 16 for the mobile device 12 at the time of the previous fix; (7) region likelihood values for each region considered by the positioning AP 16 at the time of the previous fix; and/or other information. With regard to region likelihood information, if the previous position fix was based on measurements from only one region (e.g., one floor), then region likelihood may be omitted.

Depending on the last known fix for the mobile device 12, the AP coordination module 202 can divide AP selection for the mobile device into three cases. For instance, as shown by the process 400, the AP coordination module 202 determines at stage 406 whether the last position fix for the mobile device 12 is "new," i.e., within or no older than a threshold time, or "old." If the fix is determined to be a new fix at stage 406, the AP coordination module 202 further determines at stage 408 whether the last fix is "reliable," i.e., whether the current connected AP 16 for the mobile device 12 is the same as the connected AP 16 for the mobile device 12 at the time of the fix. Based on these determinations, the AP coordination module 202 conducts AP selection as described below.

Last Position Fix: Old or not Reliable

When the AP coordination module 202 determines that no fix is available for the mobile device 12 in the last STA_DB_history_time period, as shown by stage 406, or that the current connected AP 16 for the mobile device 12 is different than the connected AP 16 at the time the last fix was provided, as shown by stage 408, the process 400 proceeds to 404 and the AP coordination module 202 conducts AP selection for the mobile device 12 in a similar manner to the AP selection algorithm for a new mobile device 12, as described above.

Last Position Fix: Recent and Reliable

If, instead, the AP coordination module 202 determines at stages 406, 408 that the previous fix for the mobile device 12 is both recent and reliable, the process 400 may proceed to stage 410 and/or stage 418. At stage 410, the AP coordination module 202 finds the AP 16 associated with the mobile device 12 that has the strongest RSSI and records this AP 16 and its RSSI. Next, at stage 412, the AP coordination module 202 determines whether the elapsed time since the timestamp of the last fix is not more than a timeout value MS_measurements_stale_timeout and whether the maximum measured RSSI as recorded at stage 410 is no less than a configurable threshold MS_MRM_strong_RSSI_thresh. Upon a positive determination at stage 412, the AP coordination module 202 assumes that the APs 16 used during the last position fix can also be used for a present fix. Accordingly, as shown at stage 414, the AP coordination module 202 skips the first iteration of AP selection, and the list of APs 16 used for the previous measurement, along with the corresponding RSSI, is prepared and used for AP selection for the second iteration of measurement. As further shown at stage 414, all neighboring regions are considered for measurement.

Alternatively, upon a negative determination at stage 412, AP selection can be conducted by the AP coordination module 202 using the strongest RSSI AP 16 identified at stage 410 as follows. First, the AP coordination module 202 compares the RSSI of the AP having the strongest RSSI at the time of the last fix (denoted as $AP_{StrRSSI}$) with the RSSI of the latest connected AP 16, if available. Based on this comparison, the AP coordination module 202 uses the quadrant AP list of the strongest RSSI AP 16 for measurement, as shown at stage 416.

In addition to, or in place of, the operations shown at stages 410, 412, 414, 416, the AP coordination module 202 may determine the number of regions used for measurement for a mobile device 12 having a recent and reliable last fix as shown beginning at stage 418. At stage 418, the AP coordination module 202 determines whether the last position fix is valid and either the HEPE for the last position fix is below a configurable HEPE threshold MS_MRM_hepe_thresh or the region likelihood for the region is both valid and above a configurable threshold MS_MRM_region_likelihood_thresh. If these conditions are met, the AP coordination module 202 utilizes only APs from the region of the last position fix for measurement during both first and second iteration of AP selection, as shown by stage 420. Otherwise, the process proceeds to stage 422, in which all neighboring regions are used.

The region likelihood is considered or otherwise used at stage 418 only if it has a valid entry. For instance, the positioning engine 204 may store the region likelihood and/or otherwise determine the region likelihood to be valid only when sufficient measurements are available for each region during the last position fix and the region likelihood value is meaningful (e.g., when multiple possible regions exist).

Figure 11:
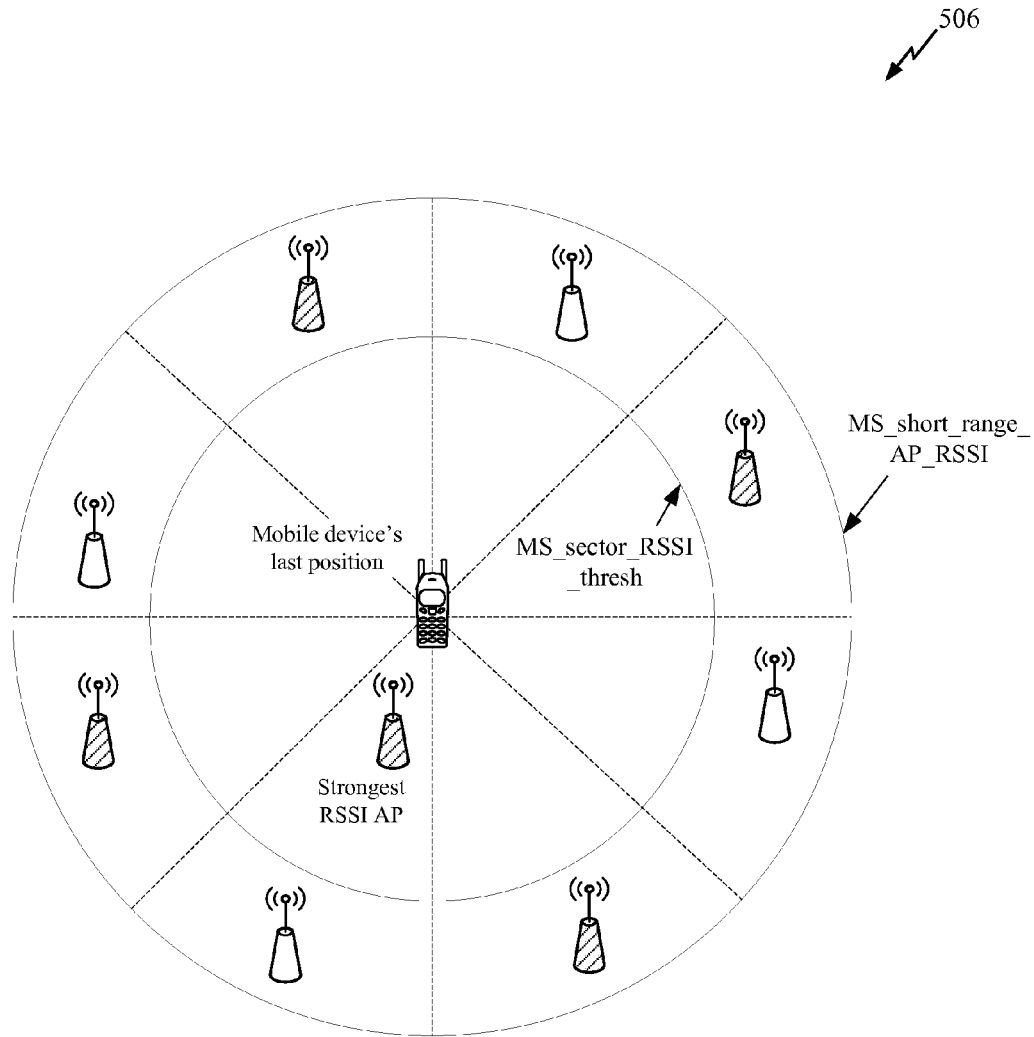

Diagram 506 in FIG. 11 shows a group of the APs 16 selected for the quadrant AP list based on the previous position fix for the mobile device 12 as described above. The selected APs in diagram 506 are denoted with line shading. Here, the AP coordination module 202 utilizes the position coordinates of the mobile device 12 corresponding to the previous position fix for AP selection as follows. Since the APs 16 which are around the previous position of the mobile device 12 may also be able to take measurements in the new position of the mobile device 12, the AP coordination module 202 determines the APs 16 to be used for the first iteration of measurement from the last position of the mobile device 12.

The AP coordination module 202 achieves this by first determining a quadrant AP list for the last position of the mobile device 12. The list includes a number of the APs 16 (e.g., five APs, including one connected AP and four others), one in each quadrant around the last position of the mobile device 12. The AP coordination module 202 selects the APs 16 around the last position fix of the mobile device in a similar manner to the construction of the quadrant AP list for each of the APs 16 as described above, with the exception that instead of the relative RSSI between the neighboring AP 16 and connected AP 16, the AP coordination module 202 uses the RSSIs of the neighboring APs at the last position of the mobile device 12 to determine the quadrant AP list around the mobile device 12. Similarly, here the AP coordination module 202 computes the positions of the neighboring APs with respect to the last position of the mobile device 12 and uses these positions as the relative position of the APs.

In the above techniques, the AP coordination module 202 and/or other modules or devices may utilize various configurable and/or programmable parameters. Examples of these parameters are summarized in Table 1 below.

TABLE 1

Configurable parameters used by AP selection.

| Parameter | Default Value | Range | Description |
|---|---|---|---|
| STA_DB_history_time | 15 sec | 1 to 50 sec | Time duration for which history of mobile device's last position and measurements is stored and used |
| MS_measurements_stale_timeout | 5 sec | 1 to 50 sec | Time duration for which the AP list used remains the same |
| MS_MRM_hepe_thresh | FFS | 0 to 20 | HEPE for good position estimate |
| MS_MRM_region_likelihood_thresh | FFS | 0.1 to 1 | Expected region likelihood for the region of the mobile device |
| MS_MRM_strong_RSSI_thresh (same as MS_MRM_AP_neigh_intrmRSSI) | −50 dB | −10 to −85 | Strong RSSI threshold |
| MS_neighboring_level | 2 | 0 to 10 | Regions which are MS_neighboring_level levels (e.g., building floors) above and below a given region, can be considered as neighboring regions |

TABLE 1-continued

Configurable parameters used by AP selection.

| Parameter | Default Value | Range | Description |
|---|---|---|---|
| MS_sector_RSSI_thresh | −70 dB | −30 to −85 | Recommended RSSI for the APs selected in Quadrant_AP_list at the location of primary AP |
| MS_Short_Range_AP_RSSI | −70 dB | −30 to −85 | Minimum RSSI of the APs determined as short range APs at the location of central AP |
| MS_inter_neigh_ap_rssi_thresh | −75 dB | −30 to −85 | Recommended RSSI for the APs selected in Quadrant_AP_list at the location of APs in their neighboring quadrants |
| MS_minSRR_AP_Cnt | 4 | Full range (0 to 0xff) | Minimum number of APs recommended in short range reduced AP list (excluding central AP) |

AP Selection: Second Iteration

Once measurement results from the APs chosen during initial AP selection are obtained at the positioning server 120 from the measurement reporting modules 16 of respective APs 16, the positioning server 120 triggers mobile device (station) region disambiguation (MS-DIS), followed by a second iteration of AP selection. In general, MS-DIS provides a list of regions to be used for measurements. During the second iteration of AP selection, only the APs 16 from the regions given by MS-DIS are chosen by the AP coordination module 202.

The AP coordination module 202 considers various inputs for the second iteration of AP selection. These may include, but are not limited to, a region parameter use_neighboring_regions that indicates the list of regions recommended for measurement, a list of the APs 16 used for measurement and their corresponding RSSIs, the MAC address and RSSI of the connected AP 16 for the mobile device 12, and/or other information.

The AP coordination module 202 conducts the second iteration of AP selection based on the inputs discussed above as follows. First, based on the measurement responses of the first phase, the AP coordination module 202 finds the AP 16 ($AP_{MaxRSSI}$) with the strongest mean RSSI ($RSSI_{Max}$). Next, the AP coordination module 202 obtains the neighboring AP list for this AP 16. The AP coordination module 202 may obtain the neighboring AP list for the AP based on a short-range AP list, a quadrant AP list, a neighboring AP list based on $RSSI_{max}$, or some other list(s).

If $RSSI_{Max}$ is greater than a configurable parameter MS_MRM_strong_RSSI_thresh, the AP coordination module 202 uses the neighboring AP list of the AP 16 having a strongest measured RSSI for measurement. Alternatively, if $RSSI_{Max}$ is less than MS_MRM_strong_RSSI_thresh and MS-DIS recommends only a single region for taking measurements, then the AP coordination module 202 may obtain a list of the APs 16 common in the neighboring AP lists of each of the APs 16 as follows. First, the AP coordination module 202 finds the AP 16 having the strongest RSSI, and all others of the APs 16 from the region recommended by MS-DIS for which measurement responses are available. The AP coordination module 202 arranges these APs 16 in decreasing order of RSSI retrieves the neighboring AP list for each of them. (Here, in order to simplify the algorithm, only the first three APs are used to determine the common AP list. More, or less, APs may also be used.) Next, the AP coordination module 202 finds the common APs 16 in the neighboring AP lists of the first two APs 16. Since the AP list is sorted in decreasing order of RSSI, these two APs 16 will have the strongest RSSI.

Based on the APs, and configurable maximum/minimum AP count parameters (Max_AP_count and Min_AP_count, respectively), the AP coordination module 202 sets the AP list for measurement as follows. First, if the number of APs 16 is less than or equal to Max_AP_count but more than Min_AP_count, the AP coordination module 202 uses the AP list for measurement. Alternatively, if the number of common APs 16 is more than Max_AP_count, the AP coordination module 202 uses the neighboring AP list of the AP 16 with the next strongest RSSI and finds the list of common APs 16. If the number of common APs 16 is still more than Max_AP_count after this step, this step is repeated until either the number of common APs 16 is less than equal to Max_AP_count or there are no more of the APs 16 left with measurements. Conversely, if the number of common APs 16 is less than Min_AP_count, the AP coordination module 202 uses the list of common APs 16 generated previously. If this is the first list of common APs 16, the AP coordination module 202 uses the neighboring AP list of the AP 16 having the strongest RSSI corresponding to the measured RSSI range.

In addition to the above, the positioning server 120 can check the status of the APs 16 before requesting measurements such that only the ones of the APs 16 that are enabled are requested to take measurements from the mobile device 12. Additionally or alternatively, the positioning server 120 may request measurements from only those APs 16 from each region selected for measurement, as described above.

Figure 12:
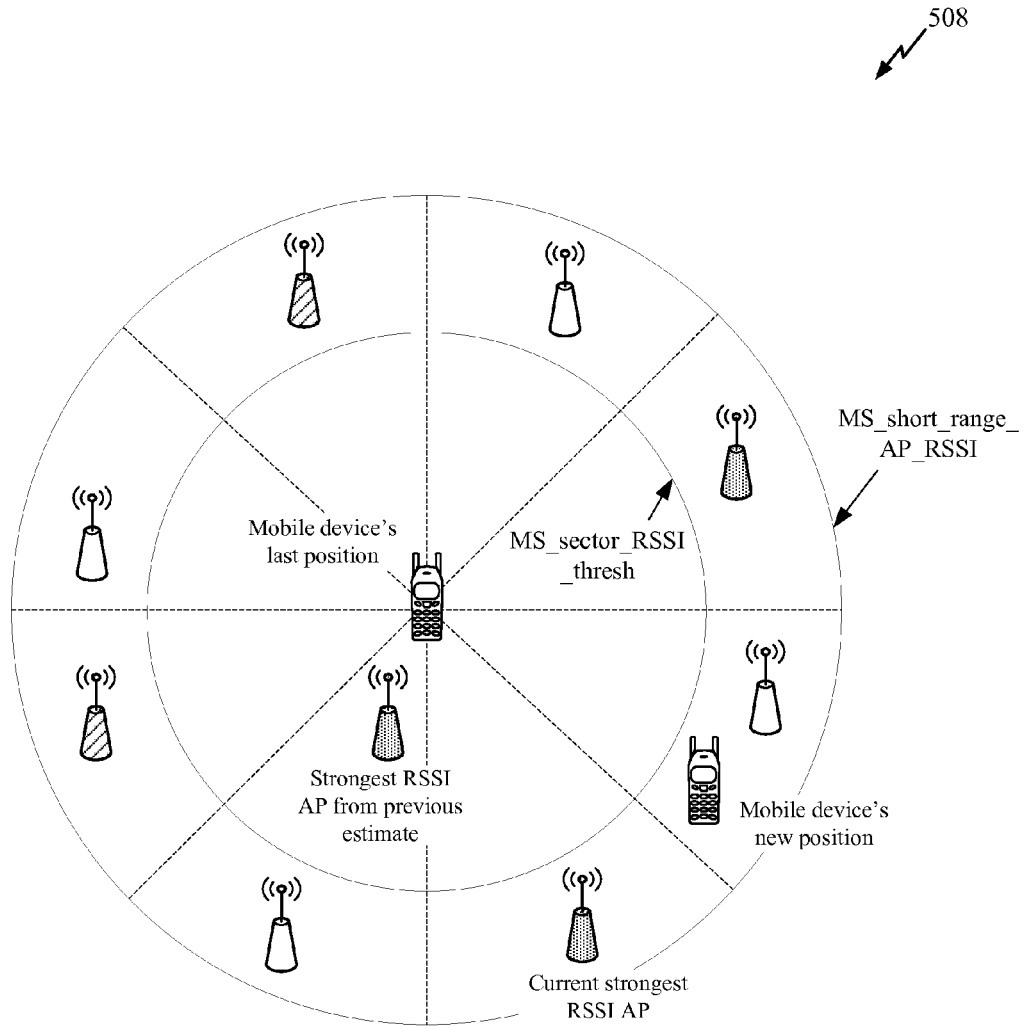

Diagram 508 shown in FIG. 12 illustrates the results of the second iteration of AP selection as described above. The APs 16 marked with dot shading are the three strongest RSSI APs 16 designated by the AP coordination module 202 based on the measurements from the first iteration.

Before the AP coordination module 202 uses RSSI values from measurement responses obtained from one of the APs 16, the AP coordination module 202 may correct the responses for the difference between the Tx power of the mobile device 12 and the Tx power assumed by the AP 16. This may be done by subtracting the Tx gain of the mobile device 12 from the measured RSSI, e.g., according to $RSSI_{Meas\_corr} = RSSI_{Meas} - Gain$, where $RSSI_{Meas}$ is the measured RSSI, $RSSI_{Meas\_corr}$ is the measured RSSI corrected by Tx Gain, and Tx Gain is the estimated Tx gain for the mobile device 12. Tx Gain may be available to the positioning server 120 at a mobile device database and/or other means. Alternatively, if the mobile device 12 is a new device, the AP coordination module 202 may assume Tx Gain to be zero.

There may be only two iterations of AP selection, as described above. However, additional iterations of measurement may be performed, e.g., when yield from preceding iterations does not reach a desirable level. As additionally described above, the first iteration of AP selection may be omitted in some cases. For instance, if a first location of the mobile device 12 is determined at a first time, the first iteration of AP selection at a second time subsequent to the first time may be omitted if the difference between the first and second times is less than a configurable time threshold, if it is determined that an estimated amount of movement (as obtained via one or more methods for movement estimation known in the art) between the first and second times is less than a configurable distance threshold, and/or upon satisfaction of other criteria as described herein. If the first iteration of AP selection is skipped, the new location of the mobile device 12 may be determined based on the previous location of the mobile device 12 as well as positioning measurements taken by a set of the APs 16 that are selected as described above with respect to the second iteration of AP selection.

With respect to the second iteration of AP selection, various configurable and/or programmable parameters may be used. Examples of these parameters are summarized in Table 2 below.

TABLE 2

Configurable parameters used by AP selection, second iteration.

| Parameter | Default Value | Range | Description |
|---|---|---|---|
| MS_MRM_Max_measurement_AP_count | 8 | 3 to 15 | Maximum number of APs recommended for measurement during AP selection iteration 2 |
| MS_MRM_Min_measurement_AP_count | 6 | 3 to 10 | Minimum number of APs recommended for measurement during AP selection iteration 2 |

Figure 13:
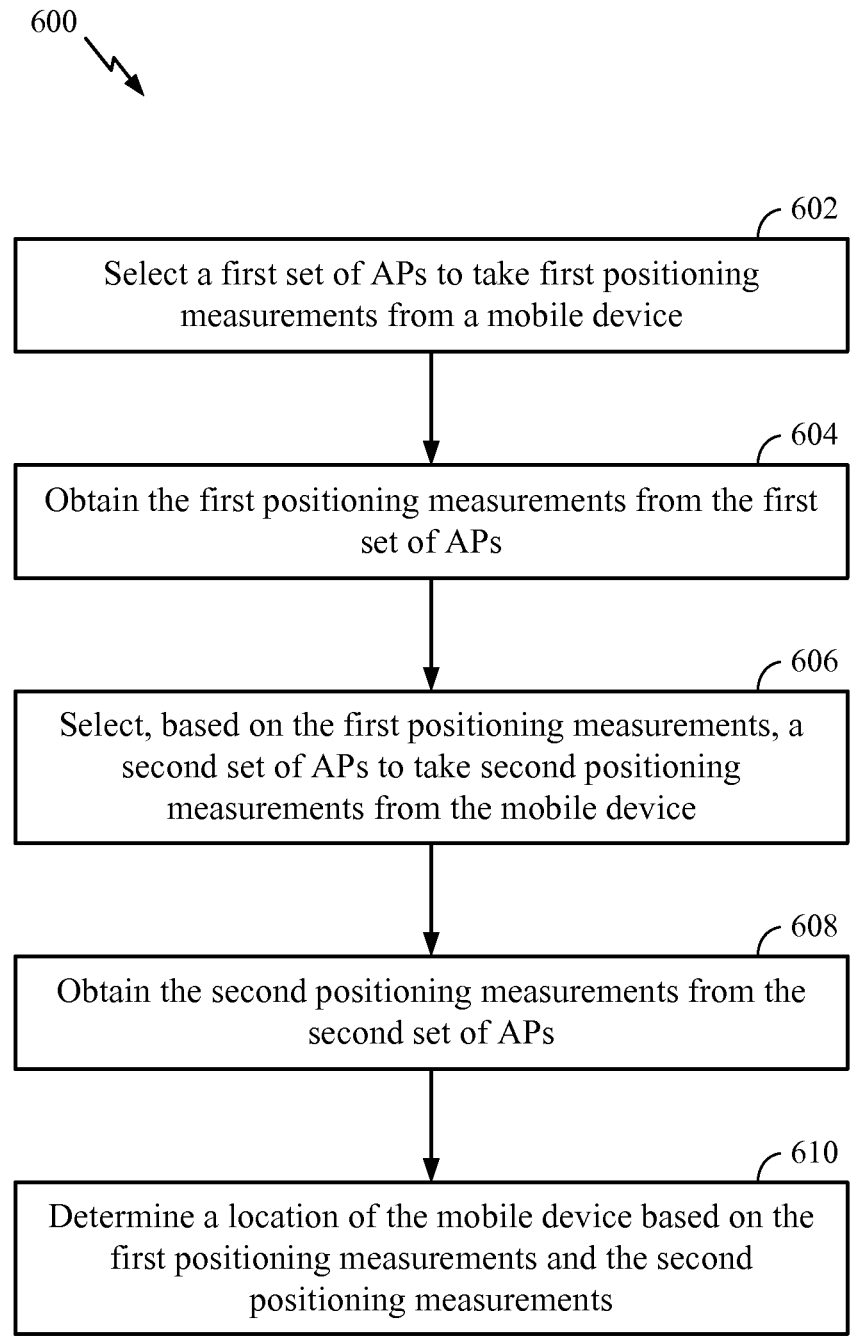
FIG. 13 is a block flow diagram of a process for network-based positioning of a mobile device.

Referring to FIG. 13, with further reference to FIGS. 1-12, a process 600 of iterative AP selection in an NBP system includes the stages shown. The process 600 is, however, an example only and not limiting. The process 600 can be altered, e.g., by having stages added, removed, rearranged, combined, and/or performed concurrently. Still other alterations to the process 600 as shown and described are possible.

At stage 602, a first set of the APs 16 is selected, e.g., by the AP coordination module 202 in association with the positioning server 120, or by other means, to take first positioning measurements from the mobile device 12. The selection performed at stage 602 is similar to that of the first iteration AP selection stage 302 in FIG. 6 as described above. Further, the manner in which AP selection is performed at stage 602 may vary based on whether a valid previous position fix is available for a given mobile device, as shown in FIG. 7. If a valid previous fix exists, the selection may further vary based on whether a present connected AP for the mobile device differs from a connected AP for the mobile device at the time of the fix, whether the previous fix is sufficiently recent, or other factors, as further shown in FIG. 7.

At stage 604, the first positioning measurements taken by the first set of APs 16 selected at stage 602 are obtained, e.g., at the AP coordination module 202 of the positioning server. The operations performed at stage 604 are similar to those of the first iteration mobile measurement stage 304 in FIG. 6 as described above. Here, the positioning server 120 (e.g., via the AP coordination module 202) instructs selected ones of the first set of APs 16 using a backhaul link 222 between the positioning server 120 and the APs 16 to take measurements from the mobile device 12. The selected APs 16, in turn, initiate a signaling exchange with the mobile device 12 (e.g., via the mobile positioning module 212 or other means) via respective ones of the wireless links 220 between the APs and the mobile device 12, conduct measurements relating to this exchange (e.g., RTT measurements, RSSI measurements, etc.), and report these measurements back to the positioning server 120 (e.g., using the measurement reporting module 214 or other means) via the backhaul link 222.

At stage 606, a second set of APs 16 is selected, e.g., by the AP coordination module 202 of the positioning server 120 or other means based on the first positioning measurements obtained at stage 604, to take second positioning measurements from the mobile device 12. The selection performed at stage 606 is similar to that of the first iteration AP selection stage 306 in FIG. 6 as described above, and is based on the first positioning measurements obtained at stage 604. Here, the positioning engine 204 and/or other components associated with the positioning server 120 determines a coarse location of the mobile device 12 based on the measurements obtained from the first set of APs 16 at stage 604. The second set of APs 16 is then chosen (e.g., by the AP coordination module 202) based on this coarse position in order to obtain a more precise position estimate for the mobile device 12.

At stage 608, the second positioning measurements taken by the second set of APs 16 selected at stage 606 are obtained, e.g., at the AP coordination module 202 of the positioning server 120. The operations performed at stage 608 are similar to those of the mobile measurement stage 308 in FIG. 6 as described above. Here, measurements are taken by respective ones of the second set of APs 16 and reported to the positioning server 120 in a similar manner to the measurements taken and reported by the first set of APs 16 at stage 604.

At stage 610, a location of the mobile device 12 is determined, e.g., by a positioning engine 204 of the positioning server 120, based on the first positioning measurements obtained at stage 604 and the second positioning measurements obtained at stage 608. The positioning operations performed at stage 610 are similar to those of the mobile positioning stage 310 shown in FIG. 6.

In general, the process 600 is an iterative AP selection and mobile positioning process that utilizes two iterations of AP selection. In some cases as identified above, the positioning server 120 may omit the first iteration of AP selection. This would result in only stages 606, 608 and 610 of the process 600 being performed for a given instance, with stage 610 modified such that only the second positioning measurements obtained at stage 608, or these second positioning measurements and first positioning measurements that were previously obtained for the mobile device 12, are used in determining the position of the mobile device 12. In still other cases, additional iterations of AP selection and measurement collection beyond the second iteration shown at stages 606 and 608 could be performed, or stages 606 and 608 could be performed multiple times. Other implementations are also possible.

Further, the process 600 described above may be implemented by the positioning server 120 and/or various components thereof, such as the AP coordination module 202, the positioning engine 204, etc., which are respectively configured to operate as means for performing the acts shown in process 600. The operations performed by the positioning server 202 and/or its components 202, 204 as shown by process 600 may be implemented in hardware, in software (e.g., by the processor 50 executing processor-executable software code 54 stored on the memory 52, which is a non-transitory processor-readable medium), or a combination of hardware or software. Further, while the positioning server 120 is shown and described as a single entity, some or all of the functionality of the positioning server 120 described above may be distributed among multiple computing devices.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for network-based positioning of a mobile device, the method comprising:
    selecting a first set of access points (APs) to take first positioning measurements from the mobile device, wherein selecting the first set of APs comprises:
        designating a central AP,
        radially dividing an area extending from the central AP into a plurality of sectors, and
        selecting, as the first set of APs, one or more APs from each of the sectors;
    obtaining the first positioning measurements from the first set of APs;
    selecting, based on the first positioning measurements, a second set of APs to take second positioning measurements from the mobile device;
    obtaining the second positioning measurements from the second set of APs; and
    determining a location of the mobile device based on the first positioning measurements and the second positioning measurements.

2. The method of claim 1, wherein selecting the first set of APs further comprises selecting the first set of APs based on relative distance between neighboring APs.

3. The method of claim 1, wherein selecting the first set of APs further comprises selecting the first set of APs based on relative signal strengths between neighboring APs.

4. The method of claim 1 wherein at least one of the first positioning measurements or the second positioning measurements comprise round trip time (RTT) measurements.

5. The method of claim 1 wherein at least one of the first positioning measurements or the second positioning measurements comprise received signal strength indication (RSSI) measurements.

6. The method of claim 1, further comprising:
    determining an amount of time that has elapsed since determining the location of the mobile device;
    responsive to the amount of time that has elapsed being less than a threshold, selecting, based on the first location of the mobile device, a third set of APs to take third positioning measurements from the mobile device, obtaining the third positioning measurements from the third set of APs, and determining a second location of the mobile device based on the first location of the mobile device and the third positioning measurements.

7. The method of claim 1, further comprising:
    determining an estimated amount of movement of the mobile device since determining the location of the mobile device;
    responsive to the estimated amount of movement of the mobile device being less than a threshold, selecting, based on the first location of the mobile device, a third set of APs to take third positioning measurements from the mobile device, obtaining the third positioning measurements from the third set of APs, and determining a second location of the mobile device based on the first location of the mobile device and the third positioning measurements.

8. The method of claim 1 wherein selecting the second set of APs comprises:
- identifying an AP of the first set of APs having a strongest mean received signal strength indication (RSSI); and
- selecting the second set of APs based on a neighboring AP list for the AP of the first set of APs having the strongest mean RSSI.

9. A method for network-based positioning of a mobile device, the method comprising:
- selecting a first set of access points (APs) to take first positioning measurements from the mobile device, wherein selecting the first set of APs comprises selecting the first set of APs based on a set of APs used for a previous position fix for the mobile device;
- obtaining the first positioning measurements from the first set of APs;
- selecting, based on the first positioning measurements, a second set of APs to take second positioning measurements from the mobile device;
- obtaining the second positioning measurements from the second set of APs; and
- determining a location of the mobile device based on the first positioning measurements and the second positioning measurements.

10. A method for network-based positioning of a mobile device, the method comprising:
- selecting a first set of access points (APs) to take first positioning measurements from the mobile device;
- obtaining the first positioning measurements from the first set of APs;
- selecting, based on the first positioning measurements, a second set of APs to take second positioning measurements from the mobile device, wherein selecting the second set of APs comprises:
  - designating an initial estimated location of the mobile device based on the first positioning measurements or a previously determined location of the mobile device,
  - radially dividing an area extending from the initial estimated location into a plurality of sectors, and
  - selecting, as the second set of APs, one or more APs from each of the sectors;
- obtaining the second positioning measurements from the second set of APs; and
- determining a location of the mobile device based on the first positioning measurements and the second positioning measurements.

11. A method for network-based positioning of a mobile device, the method comprising:
- selecting a first set of access points (APs) to take first positioning measurements from the mobile device;
- obtaining the first positioning measurements from the first set of APs;
- determining an estimated coarse position of the mobile device based on the first positioning measurements;
- selecting, based at least in part on the estimated coarse position of the mobile device, a second set of APs to take second positioning measurements from the mobile device;
- obtaining the second positioning measurements from the second set of APs; and
- determining a location of the mobile device based on the first positioning measurements and the second positioning measurements.

12. A positioning server comprising:
- an access point (AP) coordination module configured to select a first set of APs to take first positioning measurements from a mobile device, to obtain the first positioning measurements from the first set of APs, to select, based on the first positioning measurements, a second set of APs to take second positioning measurements from the mobile device, and to obtain the second positioning measurements from the second set of APs, wherein the AP coordination module is further configured to select the first set of APs by designating a central AP, radially dividing an area extending from the central AP into a plurality of sectors, and selecting, as the first set of APs, one or more APs from each of the sectors; and
- a positioning engine communicatively coupled to the AP coordination module and configured to determine a location of the mobile device based on the first positioning measurements and the second positioning measurements.

13. The positioning server of claim 12, wherein the AP coordination module is further configured to select the first set of APs based on relative distance between neighboring APs.

14. The positioning server of claim 12, wherein the AP coordination module is further configured to select the first set of APs based on relative signal strengths between neighboring APs.

15. The positioning server of claim 12 wherein at least one of the first positioning measurements or the second positioning measurements comprise round trip time (RTT) measurements or received signal strength indication (RSSI) measurements.

16. The positioning server of claim 12 wherein the AP coordination module is further configured to select the second set of APs by identifying an AP of the first set of APs having a strongest mean received signal strength indication (RSSI) and selecting the second set of APs based on a neighboring AP list for the AP of the first set of APs having the strongest mean RSSI.

17. A positioning server comprising:
- an access point (AP) coordination module configured to select a first set of APs to take first positioning measurements from a mobile device, to obtain the first positioning measurements from the first set of APs, to select, based on the first positioning measurements, a second set of APs to take second positioning measurements from the mobile device, and to obtain the second positioning measurements from the second set of APs, wherein the AP coordination module is further configured to select the first set of APs based on a set of APs used for a previous position fix for the mobile device; and
- a positioning engine communicatively coupled to the AP coordination module and configured to determine a location of the mobile device based on the first positioning measurements and the second positioning measurements.

18. A positioning server comprising:
- an access point (AP) coordination module configured to select a first set of APs to take first positioning measurements from a mobile device, to obtain the first positioning measurements from the first set of APs, to select a second set of APs to take second positioning measurements from the mobile device, and to obtain the second positioning measurements from the second set of APs; and
- a positioning engine communicatively coupled to the AP coordination module and configured to determine a location of the mobile device based on the first positioning measurements and the second positioning measurements,
wherein the positioning engine is further configured to determine an estimated coarse position of the mobile device based on the first positioning measurements, and
wherein the AP coordination module is further configured to select the second set of APs based at least in part on the estimated coarse position of the mobile device.

19. An apparatus that facilitates network-based positioning of a mobile device, the apparatus comprising:
means for selecting a first set of access points (APs) to take first positioning measurements from the mobile device, wherein the means for selecting the first set of APs comprises means for designating a central AP, means for radially dividing an area extending from the central AP into a plurality of sectors, and means for selecting, as the first set of APs, one or more APs from each of the sectors;
means for obtaining the first positioning measurements from the first set of APs;
means for selecting, based on the first positioning measurements, a second set of APs to take second positioning measurements from the mobile device;
means for obtaining the second positioning measurements from the second set of APs; and
means for determining a location of the mobile device based on the first positioning measurements and the second positioning measurements.

20. The apparatus of claim 19, wherein the means for selecting the first set of APs further comprises selecting the first set of APs based on at least one of relative distance between neighboring APs or relative signal strengths between neighboring APs.

21. The apparatus of claim 19 wherein the means for selecting the second set of APs comprises:
means for identifying an AP of the first set of APs having a strongest mean received signal strength indication (RSSI); and
means for selecting the second set of APs based on a neighboring AP list for the AP of the first set of APs having the strongest mean RSSI.

22. An apparatus that facilitates network-based positioning of a mobile device, the apparatus comprising:
means for selecting a first set of access points (APs) to take first positioning measurements from the mobile device, wherein the means for selecting the first set of APs comprises means for selecting the first set of APs based on a set of APs used for a previous position fix for the mobile device;
means for obtaining the first positioning measurements from the first set of APs;
means for selecting, based on the first positioning measurements, a second set of APs to take second positioning measurements from the mobile device;
means for obtaining the second positioning measurements from the second set of APs; and
means for determining a location of the mobile device based on the first positioning measurements and the second positioning measurements.

23. An apparatus that facilitates network-based positioning of a mobile device, the apparatus comprising:
means for selecting a first set of access points (APs) to take first positioning measurements from the mobile device;
means for obtaining the first positioning measurements from the first set of APs;
means for determining an estimated coarse position of the mobile device based on the first positioning measurements;
means for selecting, based at least in part on the estimated coarse position of the mobile device, a second set of APs to take second positioning measurements from the mobile device;
means for obtaining the second positioning measurements from the second set of APs; and
means for determining a location of the mobile device based on the first positioning measurements and the second positioning measurements.

24. A positioning server comprising:
a memory storing instructions; and
at least one processor communicatively coupled to the memory and configured to execute the instructions, wherein the instructions, when executed by the at least one processor, cause the at least one processor to:
select a first set of access points (APs) to take first positioning measurements from a mobile device, the instructions to select the first set of APs further comprise instructions to cause the at least one processor to designate a central AP,
radially divide an area extending from the central AP into a plurality of sectors, and
select, as the first set of APs, one or more APs from each of the sectors;
obtain the first positioning measurements from the first set of APs;
select, based on the first positioning measurements, a second set of APs to take second positioning measurements from the mobile device;
obtain the second positioning measurements from the second set of APs; and
determine a location of the mobile device based on the first positioning measurements and the second positioning measurements.

25. The positioning server of claim 24 wherein the instructions, when executed by the at least one processor, further cause the at least one processor to:
identify an AP of the first set of APs having a strongest mean received signal strength indication (RSSI); and
select the second set of APs based on a neighboring AP list for the AP of the first set of APs having the strongest mean RSSI.

26. A positioning server comprising:
a memory storing instructions; and
at least one processor communicatively coupled to the memory and configured to execute the instructions, wherein the instructions, when executed by the at least one processor, cause the at least one processor to:
select a first set of access points (APs) to take first positioning measurements from a mobile device;
obtain the first positioning measurements from the first set of APs;
determine an estimated coarse position of the mobile device based on the first positioning measurements;
select, based at least in part on the estimate coarse position of the mobile device, a second set of APs to take second positioning measurements from the mobile device;
obtain the second positioning measurements from the second set of APs; and
determine a location of the mobile device based on the first positioning measurements and the second positioning measurements.

27. A positioning server comprising:
a memory storing instructions; and
at least one processor communicatively coupled to the memory and configured to execute the instructions, wherein the instructions, when executed by the at least one processor, cause the at least one processor to
  select a first set of access points (APs) to take first positioning measurements from a mobile device based on a set of APs used for a previous position fix for the mobile device;
  obtain the first positioning measurements from the first set of APs;
  select, based on the first positioning measurements, a second set of APs to take second positioning measurements from the mobile device;
  obtain the second positioning measurements from the second set of APs; and
  determine a location of the mobile device based on the first positioning measurements and the second positioning measurements.

28. A positioning server comprising:
an access point (AP) coordination module configured to select a first set of APs to take first positioning measurements from a mobile device, to obtain the first positioning measurements from the first set of APs, to select, based on the first positioning measurements, a second set of APs to take second positioning measurements from the mobile device, and to obtain the second positioning measurements from the second set of APs, wherein the AP coordination module is further configured to select the second set of APs by designating an initial estimated location of the mobile device based on the first positioning measurements or a previously determined location of the mobile device, radially dividing an area extending from the initial estimated location into a plurality of sectors, and selecting, as the second set of APs, one or more APs from each of the sectors; and
a positioning engine communicatively coupled to the AP coordination module and configured to determine a location of the mobile device based on the first positioning measurements and the second positioning measurements.

29. An apparatus that facilitates network-based positioning of a mobile device, the apparatus comprising:
  means for selecting a first set of access points (APs) to take first positioning measurements from the mobile device;
  means for obtaining the first positioning measurements from the first set of APs;
  means for selecting, based on the first positioning measurements, a second set of APs to take second positioning measurements from the mobile device, wherein the means for selecting the second set of APs comprises
    means for designating an initial estimated location of the mobile device based on the first positioning measurements or a previously determined location of the mobile device,
    means for radially dividing an area extending from the initial estimated location into a plurality of sectors, and
    means for selecting, as the second set of APs, one or more APs from each of the sectors;
  means for obtaining the second positioning measurements from the second set of APs; and
  means for determining a location of the mobile device based on the first positioning measurements and the second positioning measurements.

30. A positioning server comprising:
a memory storing instructions; and
at least one processor communicatively coupled to the memory and configured to execute the instructions, wherein the instructions, when executed by the at least one processor, cause the at least one processor to:
  select a first set of access points (APs) to take first positioning measurements from a mobile device;
  obtain the first positioning measurements from the first set of APs;
  select, based on the first positioning measurements, a second set of APs to take second positioning measurements from the mobile device, the instructions to cause the at least one processor to select the second set of APs include instructions configured to cause the at least one processor to
    designate an initial estimated location of the mobile device based on the first positioning measurements or a previously determined location of the mobile device,
    radially divide an area extending from the initial estimated location into a plurality of sectors, and
    select, as the second set of APs, one or more APs from each of the sectors;
  obtain the second positioning measurements from the second set of APs; and
  determine a location of the mobile device based on the first positioning measurements and the second positioning measurements.

* * * * *